(12) United States Patent
Nishimura et al.

(10) Patent No.: US 6,584,870 B2
(45) Date of Patent: Jul. 1, 2003

(54) SHIFT LEVER DEVICE

(75) Inventors: Masaya Nishimura, Niwa-gun (JP); Kazuhiro Sato, Niwa-gun (JP); Masaki Fujita, Niwa-gun (JP); Yoshitaka Watanabe, Niwa-gun (JP); Hitoshi Kanazawa, Niwa-gun (JP); Noriyasu Shamoto, Niwa-gun (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/897,072

(22) Filed: Jul. 3, 2001

(65) Prior Publication Data
US 2001/0037700 A1 Nov. 8, 2001

Related U.S. Application Data

(62) Division of application No. 08/982,480, filed on Dec. 2, 1997, now Pat. No. 6,286,385.

(30) Foreign Application Priority Data

Sep. 19, 1996 (JP) ............................................. 8-248179

(51) Int. Cl.⁷ .......................... B60K 20/00; B60R 21/00
(52) U.S. Cl. .................. 74/473.3; 74/473.33; 74/491; 74/523; 248/900; 188/371; 180/271
(58) Field of Search ............................. 74/473.1, 473.3, 74/473.33, 491, 523; 248/900; 188/371; 180/271

(56) References Cited

U.S. PATENT DOCUMENTS

| | | | | |
|---|---|---|---|---|
| 3,780,596 A | * | 12/1973 | Takahashi et al. | ......... 74/473 P |
| 4,018,099 A | | 4/1977 | O'Brien et al. | |
| 4,266,438 A | * | 5/1981 | Kessmar | ................... 74/473 R |
| 4,285,250 A | | 8/1981 | Iizuka et al. | |
| 4,333,360 A | | 6/1982 | Simmons | |
| 4,458,549 A | | 7/1984 | Tani et al. | |
| 4,543,842 A | | 10/1985 | Katayama | |
| 4,693,135 A | | 9/1987 | LaRocca et al. | |
| 4,726,249 A | | 2/1988 | Inuzuka et al. | |
| 4,733,214 A | * | 3/1988 | Andresen | ..................... 338/128 |
| 4,787,257 A | * | 11/1988 | Ott et al. | ................... 74/473 P |
| 4,879,922 A | | 11/1989 | Suzuki | |
| 5,287,743 A | | 2/1994 | Doolittle et al. | |
| 5,288,198 A | | 2/1994 | Mozingo | |
| 5,309,783 A | | 5/1994 | Doolittle et al. | |
| 5,791,197 A | * | 8/1998 | Rempinski et al. | ....... 74/743.18 |
| 5,802,922 A | * | 9/1998 | Kawai et al. | ............... 74/473 P |
| 5,907,975 A | * | 6/1999 | Giaimo | ..................... 74/473.34 |
| 5,941,266 A | * | 8/1999 | Henwood | ..................... 137/15 |
| 5,992,261 A | * | 11/1999 | Iwata et al. | ................. 74/473.1 |
| 6,082,216 A | | 7/2000 | Watanabe et al. | |

FOREIGN PATENT DOCUMENTS

| | | | | |
|---|---|---|---|---|
| DE | 4242456 | | 6/1994 | |
| EP | 0624741 | | 11/1994 | |
| FR | 2547933 | | 11/1994 | |
| GB | 2027115 A | * | 2/1980 | ................... 74/523 |
| JP | 55-136635 | * | 10/1980 | ................... 74/523 |
| JP | 6-94108 | * | 4/1994 | ................... 74/523 |
| JP | 9-30281 | | 2/1997 | |
| JP | 9-58288 | | 3/1997 | |
| JP | 9-58289 | | 3/1997 | |
| JP | 09030281 A | | 4/1997 | |
| JP | 09058288 A | | 4/1997 | |
| JP | 09058289 A | | 4/1997 | |

OTHER PUBLICATIONS

Physics, Halliday Resnick, Parts I and II, p. 87, publisher John Wiley & Sons, Inc. 1967.*

* cited by examiner

*Primary Examiner*—Vinh T. Luong
(74) *Attorney, Agent, or Firm*—Nixon Peabody LLP; Thomas W. Cole

(57) ABSTRACT

A shift lever device having a shift lever which allows selection of an arbitrary shift range by shift operation and includes a support which rotatably supports the shift lever and includes breakable portions which break when an impact force above a preselected magnitude is applied to the shift lever. Accordingly, when an axial impact force indicative of a sudden deceleration is applied to the shift lever, the support is broken. The breakage of the support allows safer absorption of the impact force applied to the shift lever. The breakable portions may take the form of a frangible pin or bracket that pivotally supports the shift lever.

3 Claims, 25 Drawing Sheets

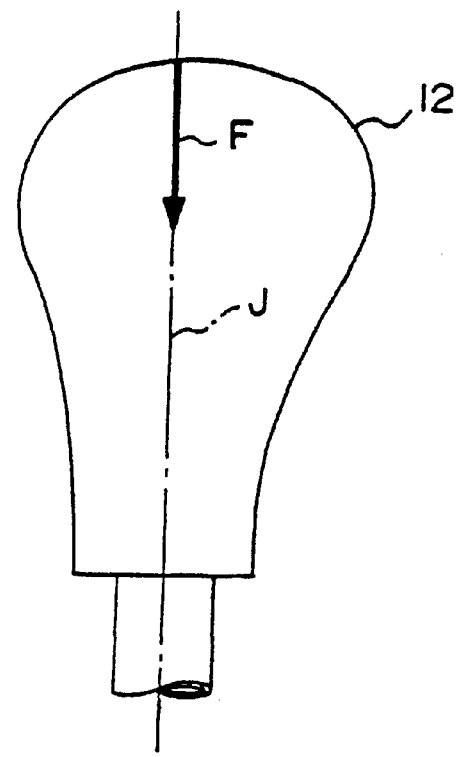
F I G. 2 4 A
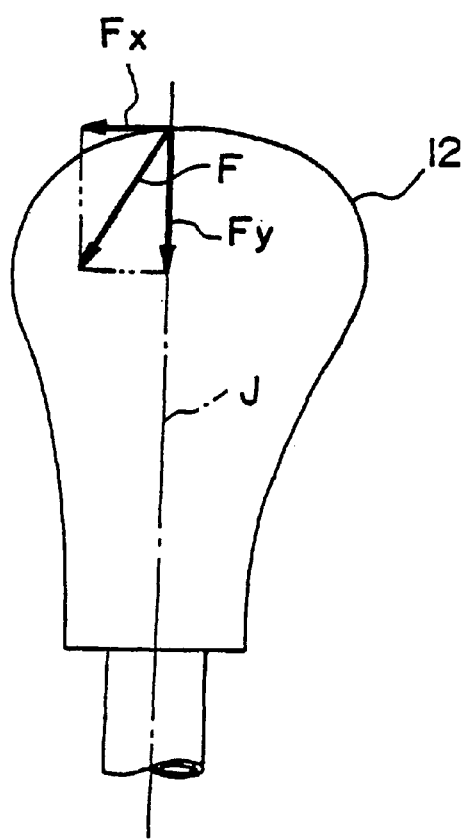
F I G. 2 4 B

PRIOR ART

SHIFT LEVER DEVICE

This is a divisional of application Ser. No. 08/982,480, filed Dec. 2, 1997 and issued Sep. 11, 2001 as U.S. Pat. No. 6,286,385 B1.

BACKGROUND OF THE INVENTION

1. Field of the Invention

The present invention relates to a shift lever device having a shock absorbing structure.

2. Description of the Related Art

As shown in FIG. 25, a lower end of a shift lever 202 is mounted on a control shaft 204 and the control shaft 204 is axially supported by a shaft 208 whose both ends are supported by bearings 206. As a result, when a shift operation of the shift lever 202 is effected, the control shaft 204 rotates to allow selection of a desired shift range.

However, when a strong force is applied to the shift lever 202 in the axial direction, the shift lever 202 does not have sufficient absorbing ability to the force.

SUMMARY OF THE INVENTION

In view of the above-described circumstances, it is an object of the present invention to provide a shift lever device having an improved absorbing ability to a strong force acting in the axial direction.

A first aspect of the present invention comprises a shift lever which allows selection of an arbitrary shift range by shift operation, and supporting means which rotatably supports the shift lever outside an interior of a vehicle, wherein when axial impact force is applied to the shift lever, the supporting means is broken.

In the shift lever device according to the first aspect, usually, the shift lever is supported rotatably by the supporting means and an arbitrary shift range can be selected by shift operation.

When impact force (strong force) is applied to the shift lever in the axial direction, the supporting means is broken. Due to the breakage of the supporting means, the impact force applied to the shift lever can be absorbed. Namely, in the shift lever device of the present invention, since the impact force applied to the shift lever can be absorbed by breakage of the supporting means. For this reason, as compared with a conventional shift lever device, the absorbing ability to the impact force is improved.

A second aspect of the present invention is constructed such that, in the first aspect, the supporting means includes: a control shaft to which a lower end of the shift lever is connected so as to allow the shift lever to be rotatable in a longitudinal direction of the vehicle; a bearing portion in which a shaft supporting hole by which the control shaft is supported is formed; and a thin-walled portion formed between the shaft supporting hole and an escape hole formed in the bearing portion.

In the shift lever device according to the second aspect, usually, the control shaft is supported by the shaft supporting hole of the bearing portion, and therefore, the shift lever is operated to rotate the control shaft and an arbitrary shift range can be selected.

When impact force is applied to the shift lever in the axial direction, the thin-walled portion of the bearing portion is pressed by the control shaft and is thereby broken. Due to the breakage of the thin-walled portion, the impact force applied to the shift lever can be absorbed. After the thin-walled portion is broken, the control shaft comes into the escape hole and moves in the direction in which the impact force acts.

As described above, the thin-walled portion is provided between the shaft supporting hole and the escape hole formed in the bearing portion, and therefore, the impact force applied to the shift lever can be absorbed without increase in the number of parts.

A third aspect of the present invention is constructed such that, in the second aspect, the transverse dimension of an opening of a hole wall forming the escape hole is made smaller than the diameter of the control shaft and is gradually made smaller in the direction away from the shaft supporting hole.

In the shift lever device according to the third aspect, after the control shaft breaks the thin-walled portion and comes into the escape hole, the control shaft abuts against the hall wall of the escape hole and moves while widening the escape hole in the transverse direction. For this reason, the decay time of impact force becomes longer and the impact force can be effectively absorbed.

A fourth aspect of the present invention is constructed such that, in the first aspect, a fragile portion is formed in a breaking portion of the supporting means which is broken due to axial impact force applied to the shift lever so as to partially lower strength of the breaking portion.

In the shift lever device according to the fourth aspect, when impact force is applied to the shift lever in the axial direction, first, breakage is caused in the fragile portion, and subsequently, the supporting means is broken. With the breakage being caused in the fragile portion as described above, the impact force can be effectively absorbed.

A fifth aspect of the present invention is constructed such that, in the first aspect, a fragile portion is formed in a breaking portion of the supporting means which is broken due to axial impact force applied to the shift lever so as to partially lower strength of the breaking portion, and at least one pair of wall surfaces is formed further at the front side than the breaking portion in a direction in which the impact force acts so that the space therebetween is gradually made smaller in a direction away from the shaft supporting hole.

In the shift lever device according to the fifth aspect, when impact force is applied to the shift lever in the axial direction, first, breakage is caused in the fragile portion, and subsequently, the thin-walled portion is broken. With the breakage being caused in the fragile portion as described above, the impact force can be effectively absorbed. Further, after breaking the thin-walled portion, the control shaft abuts against the wall surfaces and moves while widening the space of the wall surfaces in the transverse direction. For this reason, the decay time of impact force becomes longer and the impact force can be effectively absorbed.

A sixth aspect of the present invention is constructed such that, in the first aspect, the supporting means includes: a control shaft supported by a bearing portion of a shift lever device main body; a bracket mounted on the control shaft; a pin which is inserted in and passes through a through hole formed in the bracket and an axial hole formed in the shift lever so as to support the shift lever in a rotatable manner; a thin-walled portion formed in the bracket, wherein when axial impact force is applied to the shift lever, the thin-walled portion is broken; and a breaking portion formed in the pin at the side of the thin-walled portion and provided to be broken due to axial impact force being applied to the shift lever.

In the shift lever device according to the sixth aspect, usually, the shift lever is rotatably supported on the bracket by the pin. When the shift lever is operated to rotate the control shaft, an arbitrary shift range can be selected.

When impact force is applied to the shift lever in the axial direction, the thin-walled portion is pressed and broken by the shift lever and the breaking portion of the pin is also broken. Due to this breakage, the shift lever and a portion of the bracket are removed from the control shaft together with the pin and moves in the direction in which the impact force acts, thereby resulting in absorption of the impact force.

As described above, by providing a simple structure in which the thin-walled portion is formed in the bracket and the breaking portion is formed in the pin, the impact force applied to the shift lever can be absorbed.

A seventh aspect of the present invention is constructed such that, in the sixth aspect, the bracket includes a rotating bracket which rotates together with the control shaft, and a supporting bracket which projects from the rotating bracket and supports the control shaft, wherein the thin-walled portion is formed in the supporting bracket at a position where the supporting bracket is connected to the rotating bracket.

In the shift lever device according to the seventh aspect, the thin-walled portion is formed in the supporting bracket at the location where the supporting bracket is connected to the rotating bracket. Due to the impact force applied to the shift lever, bending moment acts on the location where the supporting bracket is connected to the rotating bracket, and the thin-walled portion is thereby broken.

An eighth aspect of the present invention is constructed such that, in the sixth aspect, the breaking portion is formed by making a hole in the pin along an axial direction of the pin.

In the shift lever device according to the eighth aspect, the breaking portion can be formed in the pin without alteration of the appearance of the pin, no alteration in the shape of a mounting portion of the pin is required.

A ninth aspect of the present invention is constructed such that, in the sixth aspect, the bracket includes a rotating bracket which rotates together with the control shaft, and a supporting bracket which projects from the rotating bracket and supports the control shaft, wherein the thin-walled portion is formed in the supporting bracket at a position where the supporting bracket is connected to the rotating bracket, and the breaking portion is formed by making a hole in the pin along an axial direction of the pin.

In the shift lever device according to the ninth aspect, the thin-walled portion is formed in the supporting bracket at the location where the supporting bracket is connected to the rotating bracket. Due to the impact force applied to the shift lever, bending moment acts on the location where the supporting bracket is connected to the rotating bracket and the thin-walled portion is thereby broken. The breaking portion can be formed without alteration of the appearance of the pin, no alteration in the shape of a mounting portion of the pin is required.

A tenth aspect of the present invention is constructed such that, in the first aspect, the supporting means includes: a control shaft supported by a bearing portion of a shift lever device main body; a bracket mounted on the control shaft; and a pin which is inserted in and passes through a through hole formed in the bracket and an axial hole formed in the shift lever so as to support the shift lever in a rotatable manner, the pin being pressed and broken by the shift lever when axial impact force is applied to the shift lever.

In the shift lever device according to the tenth aspect, usually, the shift lever is rotatably supported on the bracket by the pin. When the shift lever is operated to rotate the control shaft, an arbitrary shift range can be selected.

When impact force is applied to the shift lever in the axial direction, the pin is pressed and broken by the shift lever and the shift lever is removed from the bracket together with the pin and moves in the direction in which the impact force acts, thereby resulting in absorption of the impact force.

As described above, by providing a simple structure in which the shift lever is rotatably supported on the bracket by the pin which is pressed and broken by the shift lever due to the axial impact force applied to the shift lever, the impact force applied to the shift lever can be absorbed.

An eleventh aspect of the present invention is constructed such that, in the first aspect, the supporting means includes: a control shaft to which a lower end of the shift lever is connected so as to allow the shift lever to be rotatable in a longitudinal direction of the vehicle; a bearing portion in which a shaft supporting hole by which the control shaft is supported is formed; and a diameter-reduced portion formed in the control shaft and provided to be pressed and broken by the shift lever device due to axial impact force being applied to the shift lever.

In the shift lever device according to the eleventh aspect, usually, the control shaft is supported by the shaft supporting hole of the bearing portion. For this reason, when the shift lever is operated to rotate the control shaft, an arbitrary shift range can be selected.

When impact force is applied to the shift lever in the axial direction, the control shaft is pressed by the shift lever and the diameter-reduced portion is broken. Due to this breakage, the shift lever and the control shaft are separated from the bearing portion and move in the direction in which the impact force acts, thereby resulting in absorption of the impact force.

As described above, the impact force applied to the shift lever device is absorbed due to the breakage of the diameter-reduced portion formed in the control shaft, and therefore, the structure of the device becomes simple without increase in the number of parts.

A twelfth aspect of the present invention is constructed such that, in the eleventh aspect, a hollow portion is formed in the control shaft along an axial direction of the control shaft.

In the shift lever device according to the twelfth aspect, the control shaft is lightened by forming the hollow portion therein. By changing the shape of the hollow portion in the axial direction of the control shaft, the breaking strength of the diameter-reduced portion can be varied.

A thirteenth aspect of the present invention is constructed such that, in the eleventh aspect, a plurality of diameter-reduced portions is provided at different positions along the axial direction of the control shaft and at least one of the plurality of diameter-reduced portions has a different breaking strength than those of other diameter-reduced portions.

In the shift lever device according to the thirteenth aspect, the difference in time of breakage is caused between the diameter-reduced portions, and therefore, the impact force applied to the shift lever can be effectively absorbed.

A fourteenth aspect of the present invention is constructed such that, in the first aspect, the supporting means includes: a control shaft to which a lower end of the shift lever is connected so as to allow the shift lever to be rotatable in a longitudinal direction of the vehicle; a connecting plate on which a shaft supporting hole by which the control shaft is supported is formed; and a shear plate which is inserted in and passes through a supporting hole formed in the connecting plate and a fixed hole formed in a main body frame of the shift lever device so as to allow the connecting plate to be fixed to the main body frame, the shear plate being pressed and broken by the connecting plate when axial impact force is applied to the shift lever.

In the shift lever device according to the fourteenth aspect, usually, the control shaft is supported by the shaft supporting hole of the connecting plate and the connecting plate is fixed to the main body plate by the shear plate. For this reason, when the shift lever is operated to rotate the control shaft, an arbitrary shift range can be selected.

When impact force is applied to the shift lever in the axial direction, the connecting plate by which the control shaft is supported is provided to move in the direction in which the impact force acts. As a result, the shear plate is pressed and broken by the connecting plate, and therefore, the connecting plate is separated from the main body frame and moves in the direction in which the impact force acts, thereby resulting in absorption of the impact force.

Further, the shift lever and the connecting plate can be disposed on a straight line, and therefore, no space for installation is required.

A fifteenth aspect of the present invention is constructed such that, in the fourteenth aspect, the shear plate is formed of a material whose strength is lower than those of the connecting plate and the main body frame of the shift lever device.

In the shift lever device according to the fifteenth aspect, only the shear plate is broken without breaking the connecting plate and the main body frame so that the impact force applied to the shift lever can be absorbed.

A sixteenth aspect of the present invention is constructed such that, in the first aspect, the supporting means includes: a control shaft supported by a bearing portion of a shift lever device main body and having an insertion through hole formed therein; a bracket provided in a lower portion of the shift lever and having a shaft supporting hole formed therein; a pin which is inserted in and passes through the through hole and the supporting hole; and a thin-walled portion formed between the shaft supporting hole and an escape hole formed in the bracket.

In the shift lever device according to the sixteenth aspect, usually, the pin is inserted in and passes through the shaft supporting hole of the bracket and the insertion through hole of the control shaft. When the shift lever is operated to rotate the control shaft, an arbitrary shift range can be selected.

When impact force is applied to the shift lever in the axial direction, the bracket formed at the lower end of the shift lever is pushed against the pin, and therefore, the thin-walled portion of the bracket is pressed due to this reaction and is thereby broken. Due to the breakage of the thin-walled portion, the pin moves in such a manner as to come into the escape hole, and therefore, the impact force applied to the shift lever can be absorbed.

As described above, the thin-walled portion is provided between the shaft supporting hole and the escape hole formed in the bracket of the shift lever, and therefore, the impact force applied to the shift lever can be absorbed without increase in the number of parts.

A seventeenth aspect of the present invention is constructed such that, in the sixteenth aspect, the transverse dimension of an opening of a hole wall forming the escape hole is made smaller than the diameter of the pin and is gradually made smaller in the direction away from the shaft supporting hole.

In the shift lever device according to the seventeenth aspect, after the pin breaks the thin-walled portion and comes into the escape hole, the pin abuts against the hole wall of the escape hole and moves while widening the escape hole in the transverse direction. For this reason, the decay time of impact force becomes longer and the impact force can be effectively absorbed.

An eighteenth aspect of the present invention is constructed such that, in the first aspect, the supporting means includes: a spherical body to which a lower end of the shift lever is connected; a spherical body receiver which holds the spherical body; a receiving pedestal which supports the spherical body receiver in a rotatable manner; and a bearing portion by which the receiving pedestal is mounted to the shift lever device main body and which is broken due to impact force applied to the shift lever.

In the shift lever device according to the eighteenth aspect, usually, the spherical body receiver for holding the spherical body is supported on the receiving pedestal in a rotatable manner and the receiving pedestal is mounted to the main body by the bearing portion. For this reason, when the shift lever is operated to rotate the spherical body, an arbitrary shift range can be selected.

When impact force is applied to the shift lever in the axial direction, the spherical body presses the spherical body receiver. As a result, the receiving pedestal is also pressed and the bearing portion is broken, the spherical body receiver is separated from the shift lever device main body, and further, the shift lever moves in the direction in which the impact force acts, thereby resulting in absorption of the impact force.

As described above, the impact force acts on the bearing portion via the spherical body, and therefore, even if the direction in which the impact force acts is in an unfixed or eccentric state, the impact force can be reliably absorbed.

A nineteenth aspect of the present invention is constructed such that, in the eighteenth aspect, a supporting portion for supporting the spherical body receiver of the receiving pedestal is formed in the shape of a cone whose diameter is reduced in a direction away from the spherical body receiver.

In the shift lever device according to the nineteenth aspect, even if the direction in which the impact force acts is in an unfixed or eccentric state, the spherical body receiver moves along the cone-shaped supporting portion to the center thereof and the impact force can be reliably absorbed accordingly.

BRIEF DESCRIPTION OF THE DRAWINGS

FIG. 24A is a diagram which illustrates the relationship between impact force and the direction of force acting parallel to the axial line of a shift lever; and FIG. 24B is a diagram which illustrates the relationship between impact force and the direction of force acting obliquely with respect to the axial line of the shift lever.

DESCRIPTION OF THE PREFERRED EMBODIMENTS

Figure 1:
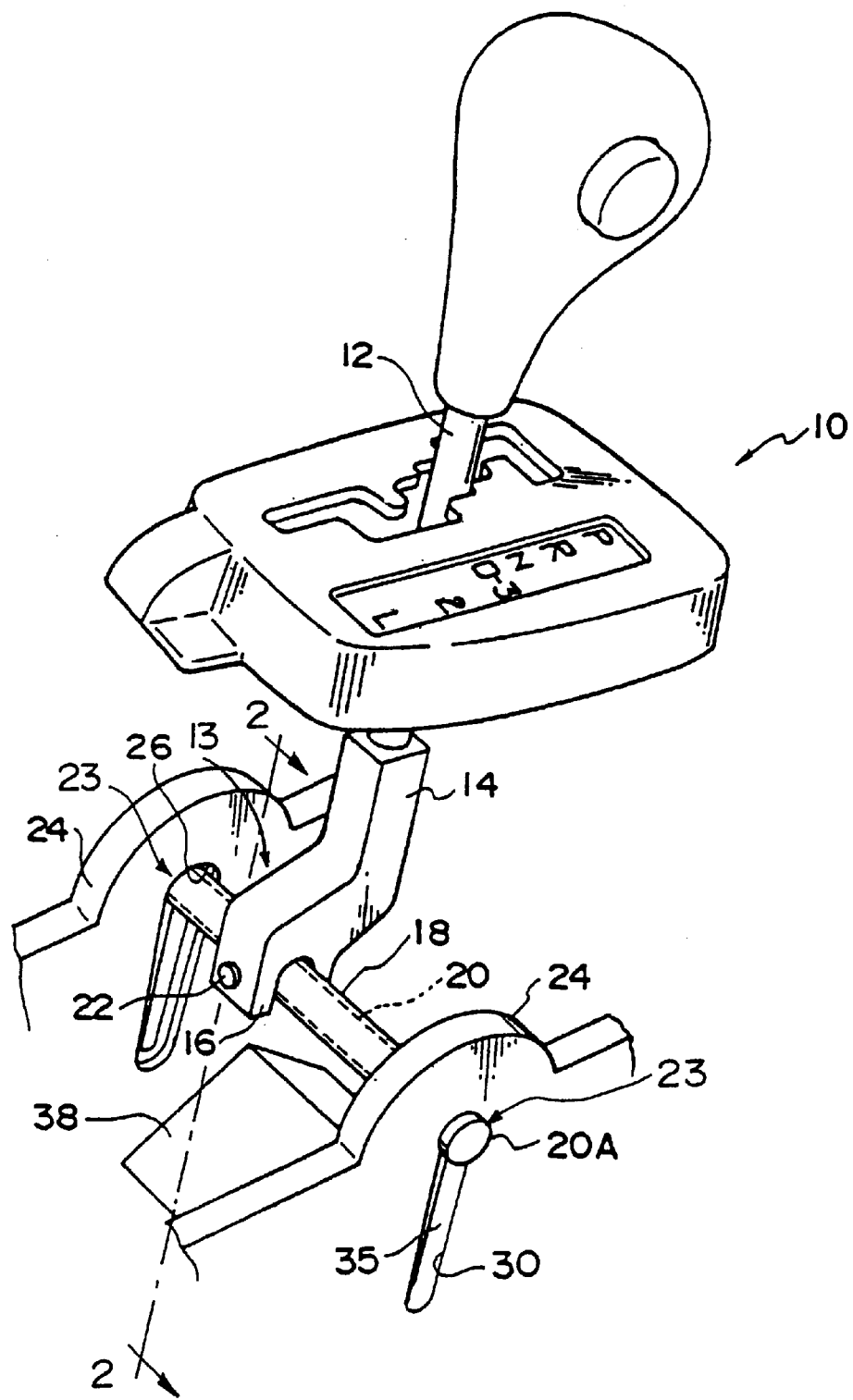
FIG. 1 is a perspective view of a principal portion of a shift lever device according to a first embodiment of the present invention.
Figure 2:
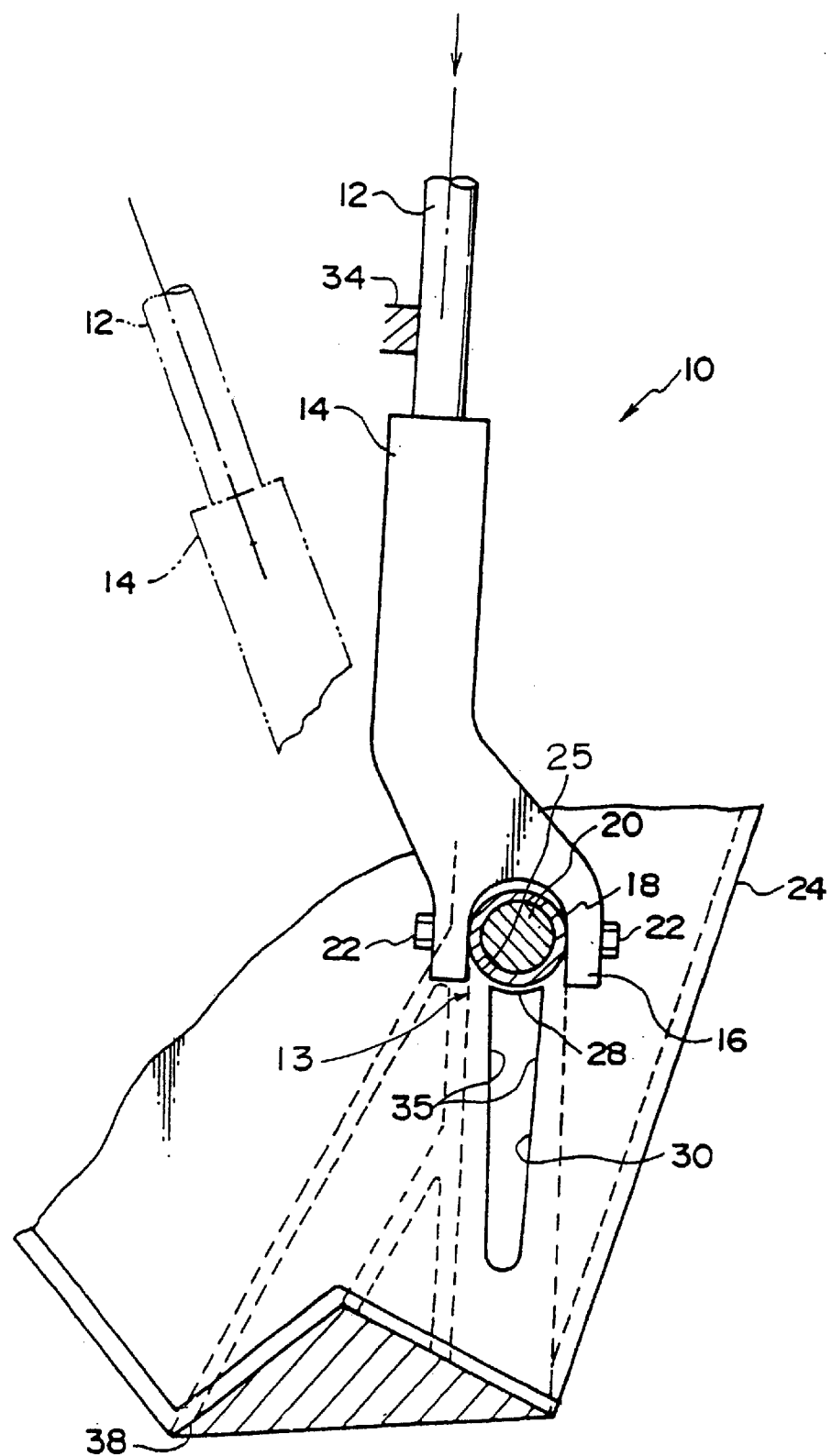
FIG. 2 is a cross-sectional view of the principal portion of the shift lever device according to the first embodiment of the present invention.
Figure 3:
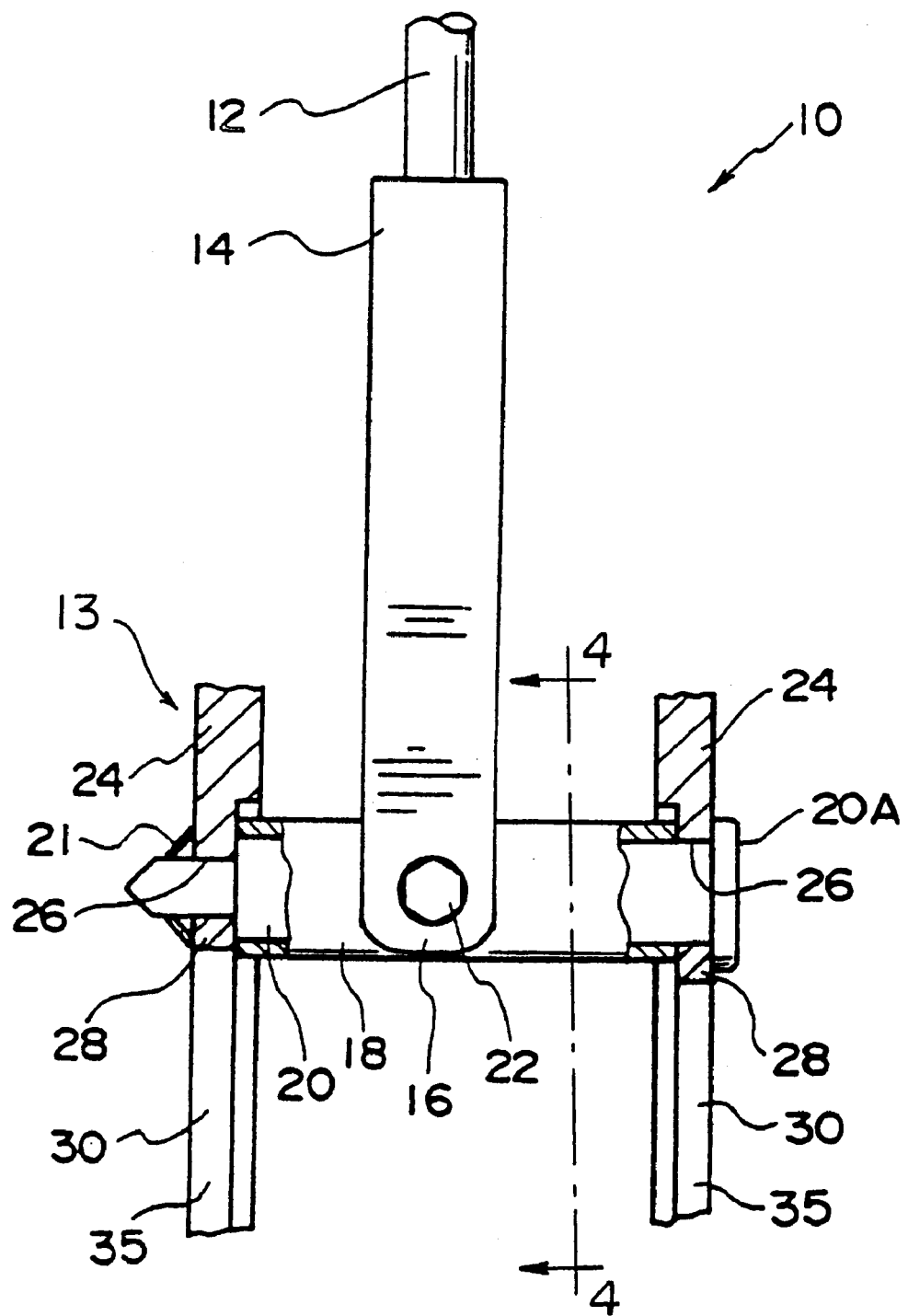
FIG. 3 is a partially broken front view of the principal portion of the shift lever device according to the first embodiment of the present invention.

FIGS. 1 through 3 each show a shift lever device 10 according to a first embodiment of the present invention.

The shift lever device 10 has a shift lever 12 for a shift operation and the lower end of the shift lever 12 is mounted on a lever holder 14.

A bracket 16 is formed at the lower end of the lever holder 14 and is mounted on a cylindrical control shaft 18. The bracket 16 is connected by a pin 22 to a control shaft 18 and the lever holder 14 is provided to be rotatable along the axial line of the control shaft 18.

The control shaft 18 is axially supported by a shaft 20. The shaft 20 is supported on shaft supporting holes 26 of a pair of parallel shaft supporting plates 24 formed upright from a main body of the shift lever device 10. As a result, the shift lever 12 is provided to be rotatable in the longitudinal direction of a vehicle with the shaft 20 serving as an axis and is also provided to be rotatable in the transverse direction of the vehicle with the pin 22 serving as an axis. The pair of shaft supporting plates 24 is provided outside an interior of the vehicle.

A strength gate is provided in the main body of the shift lever device 10. When the shift lever 12 located in the D-range (according to circumstances, the 2-range or L-range) rotates in the direction of N-range, the shift lever 12 abuts against an N wall 34 of the strength gate and is stopped at the position of N-range (i.e., the position indicated by the solid line in FIG. 2). As a result, the shift lever 12 does not inadvertently come into the R-range or the P-range (i.e., the position indicated by the two-dot chain line in FIG. 2). When the shift lever 12 is rotated in the transverse direction of the vehicle with the pin 22 serving as an axis, the shift lever 12 does not abut against the N wall 34 and can thereby be moved into the R-range or the P-range.

A control lever (not shown) overhangs from the control shaft 18 and a pin of the control lever is connected to an automatic transmission via a transmission mechanism. In this state, the operation of the shift lever 12 allows shift of the automatic transmission.

The shaft 20 supported by the shaft supporting holes 26 is prevented from being drawn out with a push nut 21 being disposed at one end of the shaft 20. A diameter-enlarged portion 20A is formed at the other end of the shaft 20 to prevent drawing of the shaft 20. Further, a reinforcing rib 38 is formed between the pair of shaft supporting plates 24 to reinforce the shaft supporting plates 24.

A slot-shaped escape hole 30 is formed in each of the shaft supporting plates 24 with a predetermined thin-walled portion 28 being formed between the shaft supporting hole 26 and the escape hole 30 (see FIG. 2). Respective thin-walled portions 28 of the shaft supporting plates 24 are provided to have the same thickness. Further, the escape hole 30 is formed parallel to the axial line of the shift lever 12 located in the N-range. The space of a hole wall which forms the escape hole 30 is set such that the transverse dimension of the escape hole 30 gradually decreases as it goes away from the shaft supporting hole 26 so that the escape hole 30 has the same transverse dimension as the diameter of the shaft 20 at the substantially intermediate portion thereof. For this reason, a wall surface 35 is formed at a front side in a direction in which axial impact force acts on the shift lever 12 such that the width thereof is made smaller than the diameter of the shaft 12 and gradually decreases in the direction away from the shaft supporting hole 26.

Figure 4:
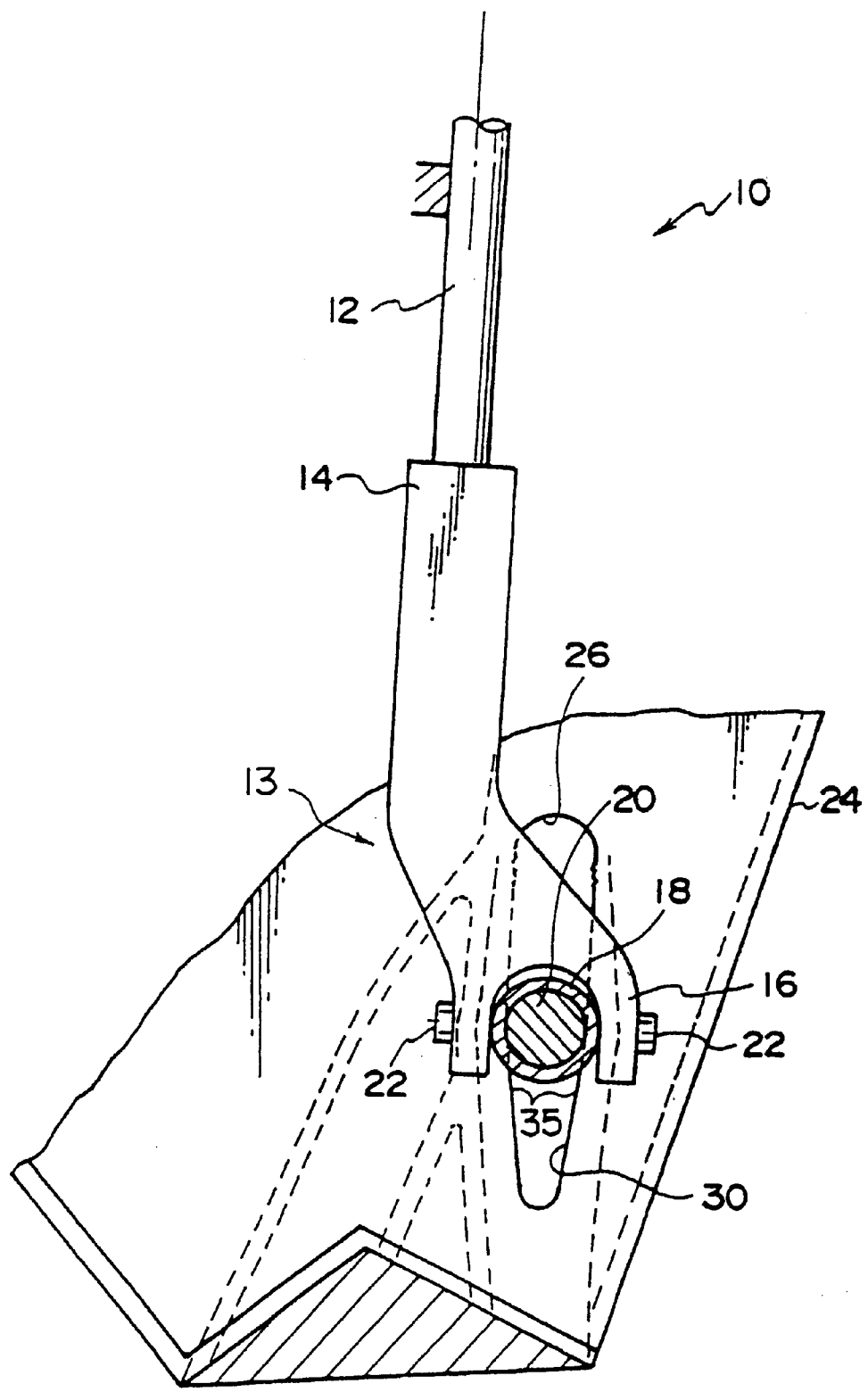
FIG. 4 is a cross-sectional view of the principal portion, which shows a state in which impact force is applied to the shift lever device according to the first embodiment of the present invention.

Accordingly, when axial impact force is applied to the shift lever 12 located in the N-range, the impact force causes the thin-walled portion 28 to be pressed and broken by the shaft 20. The breakage of the thin-walled portion 28 allows absorption of impact force and also causes the shaft 20 to move to come into the escape hole 30. Further, the transverse dimension of the escape hole 30 gradually decreases as it goes away from the shaft supporting hole 26. For this reason, as shown in FIG. 4, the shaft 20 abuts against the hole wall (the wall surface 35) of the escape hole 30 during movement of the shaft 20 and further moves to widen the escape hole 30 in the transverse direction. As a result, resistance to movement of the shaft 20 is generated and a decay time of impact force becomes longer, thereby allowing more effective absorption of impact force.

Figure 5:
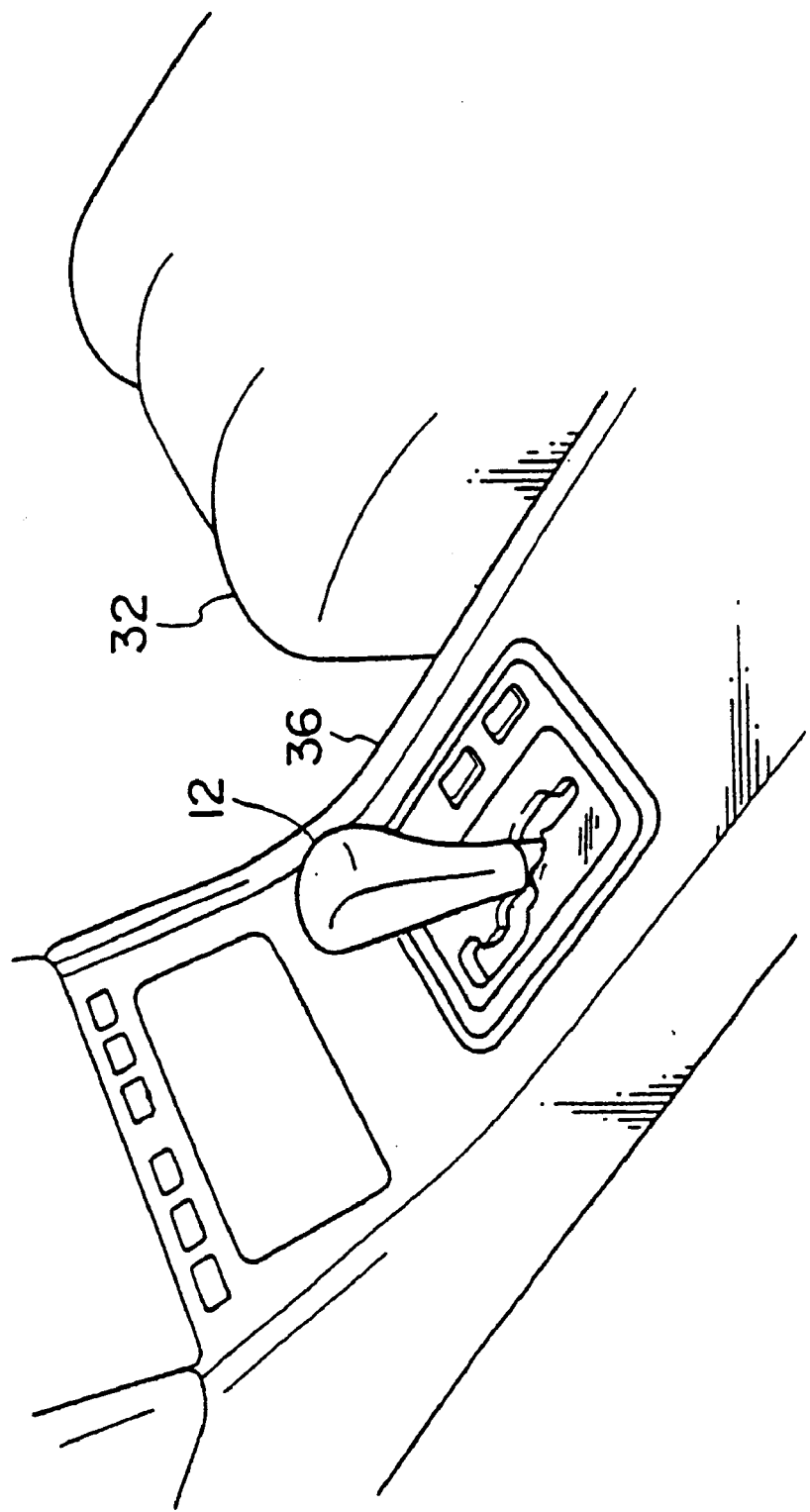
FIG. 5 is a perspective view of an interior of a vehicle, which shows a state in which impact force is applied to the shift lever device according to the first embodiment of the present invention.

Further, when the shaft 20 moving within the escape hole 30 stops moving, as shown in FIG. 5, the shift lever 12 comes into a center console 36 so that a head portion of the shift lever 12 is made substantially at the same plane as a seat surface of a seat 32. For this reason, there is a small possibility that a vehicle occupant or baggage hits against the shift lever 12 once again.

Meanwhile, the above-described impact force means force F which acts on the shift lever 12 along the axial line J as illustrated in FIG. 24A. When force F acts obliquely with respect to axial line J of the shift lever 12 as illustrated in FIG. 24B, the impact force means component Fy of the direction of axial line J among component Fy of the direction of axial line J and component Fx of the direction perpendicular to the axial line J (in the following description as well, the impact force will be thus defined). Accordingly, not only when force F acts along axial line J of the shift lever 12, but also when force F acts obliquely with respect to axial line J, the above force F can be absorbed.

Next, an operation of the shift lever device 10 according to the first embodiment will be described.

In an ordinary state, the shaft 20 is supported by the shaft supporting holes 26. For this reason, when the shift lever 12 is operated to rotate the lever holder 14, the control shaft 18 also rotates to allow selection of an arbitrary shift range.

At the time of a vehicle running, the shift lever 12 is located in the D-range (as occasion demands, the 2-range or the L-range). When the impact force is applied to the shift lever 12 at the time of sudden deceleration of a vehicle, the shift lever 12 moves from the D-range to the N-range. In the N-range, the shift lever 12 abuts against the N wall 34, and therefore, the shift lever 12 does not move inadvertently to the R-range or the P-range.

Subsequently, since the thin-walled portions 28 are pressed by the shaft 20 due to the impact force and is thereby broken, absorption of the impact force is achieved.

After breakage of the thin-walled portions 28, as shown in FIG. 4, the shaft 20 moves in such a manner as to come into the escape holes 30. The transverse dimension of each of the escape holes 30 gradually decreases in the direction away from the shaft supporting hole 26 so as to have the same dimension as the diameter of the shaft 20 at the substantially intermediate portion of the escape hole 30. For this reason, the shaft 20 abuts against the hole wall (the wall surface 35) of the escape hole 30 during movement thereof and further moves to widen the escape holes 30 in the transverse direction. As a result, resistance to the movement of the shaft 20 is generated and the decay time of impact force becomes longer, thereby allowing more effective absorption of the impact force.

As described above, in the shift lever device 10 according to the first embodiment, when the impact force is applied to the shift lever 12, the shaft 20 is provided to break the thin-walled portions 28. For this reason, as compared with a conventional shift lever device, absorbing ability to the impact force is improved. Further, with no increase in the number of parts, the impact force applied to the shift lever 12 can be absorbed.

Meanwhile, the shift lever device 10 can arbitrarily adjust, by varying the thickness of each of the thin-walled portions 28, the magnitude of impact force by which the thin-walled portions 28 are broken.

The shape of the escape hole 30 is not limited to the aforementioned. For example, the escape hole 30 may be formed to be curved gently. Further, the space of the hole wall (the wall surface 35) which forms the escape hole 30 may be set such that the transverse dimension thereof at an end portion of the escape hole 30 on the side of the thin-walled portion 28 has the same dimension as the diameter of the shaft 20 and gradually decreases in the direction away from the shaft supporting hole 26. As a result, the shaft 20 having broken the thin-walled portions 28 to come into the escape holes 30 abuts against the hole walls of the escape holes 30 from the beginning of the movement thereof and further moves to widen the escape holes 30 in the transverse direction. For this reason, as compared with the above case in which the space of the hole wall which forms the escape hole 30 is set so as to have the same dimension as the diameter of the shaft 20 substantially at the intermediate portion thereof, more effective absorption of the impact force applied to the shift lever 12 can be achieved.

Figure 6:
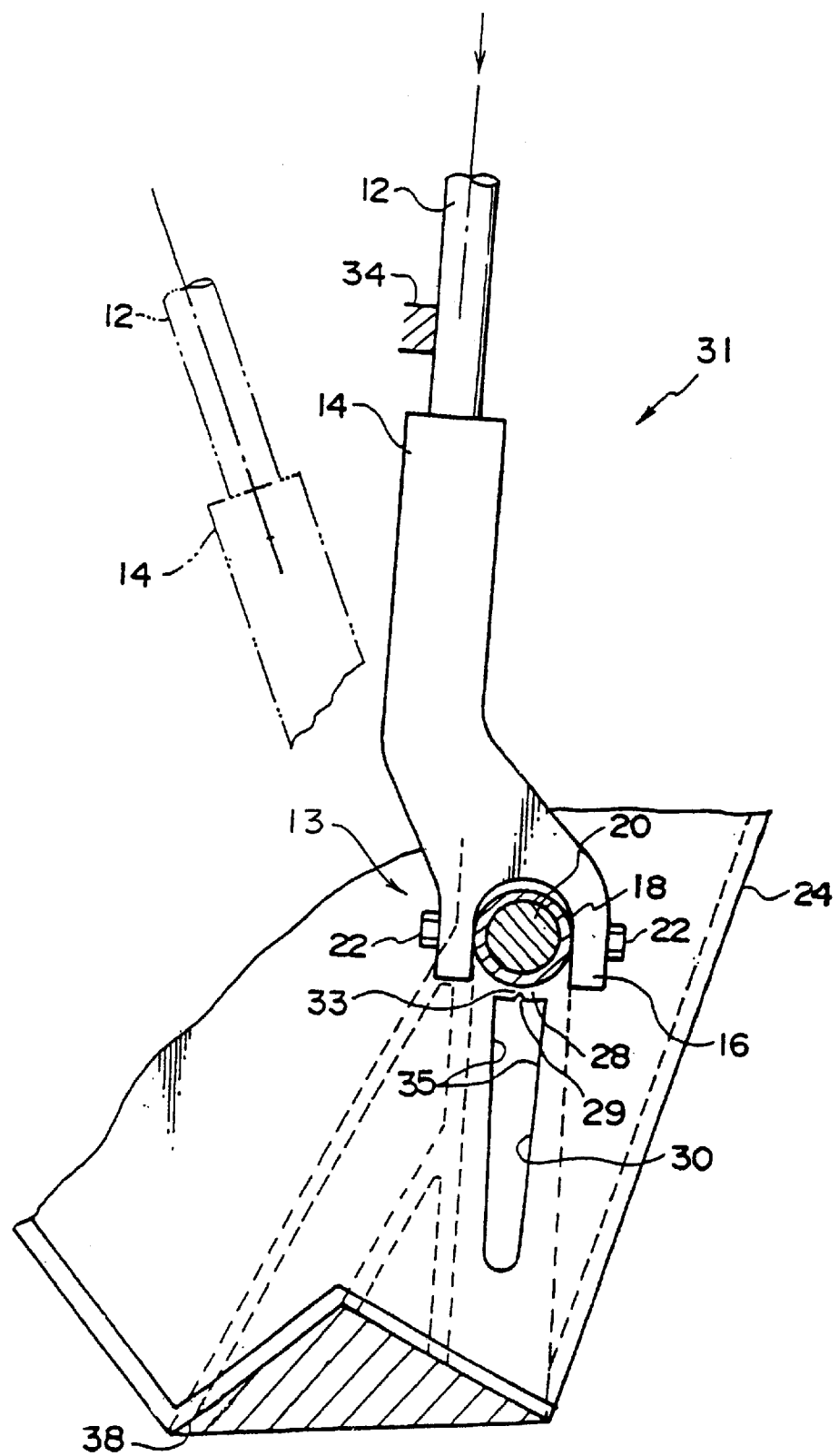
FIG. 6 is a cross-sectional view of a principal portion of a shift lever device according to a modified example of the first embodiment of the present invention.

FIG. 6 shows a shift lever device 31 according to a modified example of the first embodiment of the present invention. It should be noted that the same members as those of the shift lever device 10 according to the first embodiment will be denoted by the same reference numerals, and a description thereof will be omitted.

The shift lever device 31 is different from the shift lever device 10 according to the first embodiment in that a notch 29 is formed substantially at the center of the thin-walled portion 28. The notch 29 has a wedge-shaped configuration and is formed from the side of the escape hole 30 (from the lower side on the paper shown in FIG. 6) substantially to the center of the thin-walled portion 28. The region with the notch 29 formed therein serves as a fragile portion 33 having a low breaking strength for the thin-walled portion 28.

Accordingly, in the shift lever device 31, when the thin-walled portion 28 is pressed by the shaft 20 due to axial impact force applied to the shift lever 12, first, breakage is caused in the fragile portion 33. Subsequently, the shaft 20 moves to come into the escape hole 30 while widening divided portions of the thin-walled portion 28 (i.e., both side portions with the fragile portion 33 disposed therebetween in FIG. 6). Thereafter, in the same way as in the shift lever device 10 according to the first embodiment, the shaft 20 abuts against the hole surface (i.e. the wall surface 35) of the escape hole 30 during the movement thereof and further moves while widening the escape holes 30 in the transverse direction. Thus, due to breakage being caused in the fragile portion 33, the impact force applied to the shift lever 12 can be effectively absorbed.

Meanwhile, it is not necessary that the above fragile portion be formed by the notch 29 provided in the thin-walled portion 28 as described above. In other words, it suffices that the thin-walled portion 28 be partially made weak. Accordingly, for example, in the same way as in the shift lever device 10 according to the first embodiment, the fragile portion may also be provided in such a manner that the thin-walled portion 28 is formed to have a uniform thickness, and thereafter, a reinforcing member is fixed to a portion of the thin-walled portion 28 other than the central portion of the thin-walled portion 28. Namely, in this case, the portion of the thin-walled portion 28 with no reinforcing member being fixed thereto functions as a fragile portion having a low strength.

Further, each breaking strength of the fragile portions 33 of the two thin-walled portions 28 needs not to be set at the same value and may be set differently by, for example, varying respective sizes of the notches 29. In this case, when any one of the fragile portions 33 having a low breaking strength is first broken by a small impact force and further impact force is applied, the remaining fragile portion 33 (having a high breaking strength) can be broken. In this way, the impact force applied to the shift lever 12 can be effectively absorbed in two stages.

Figure 7:
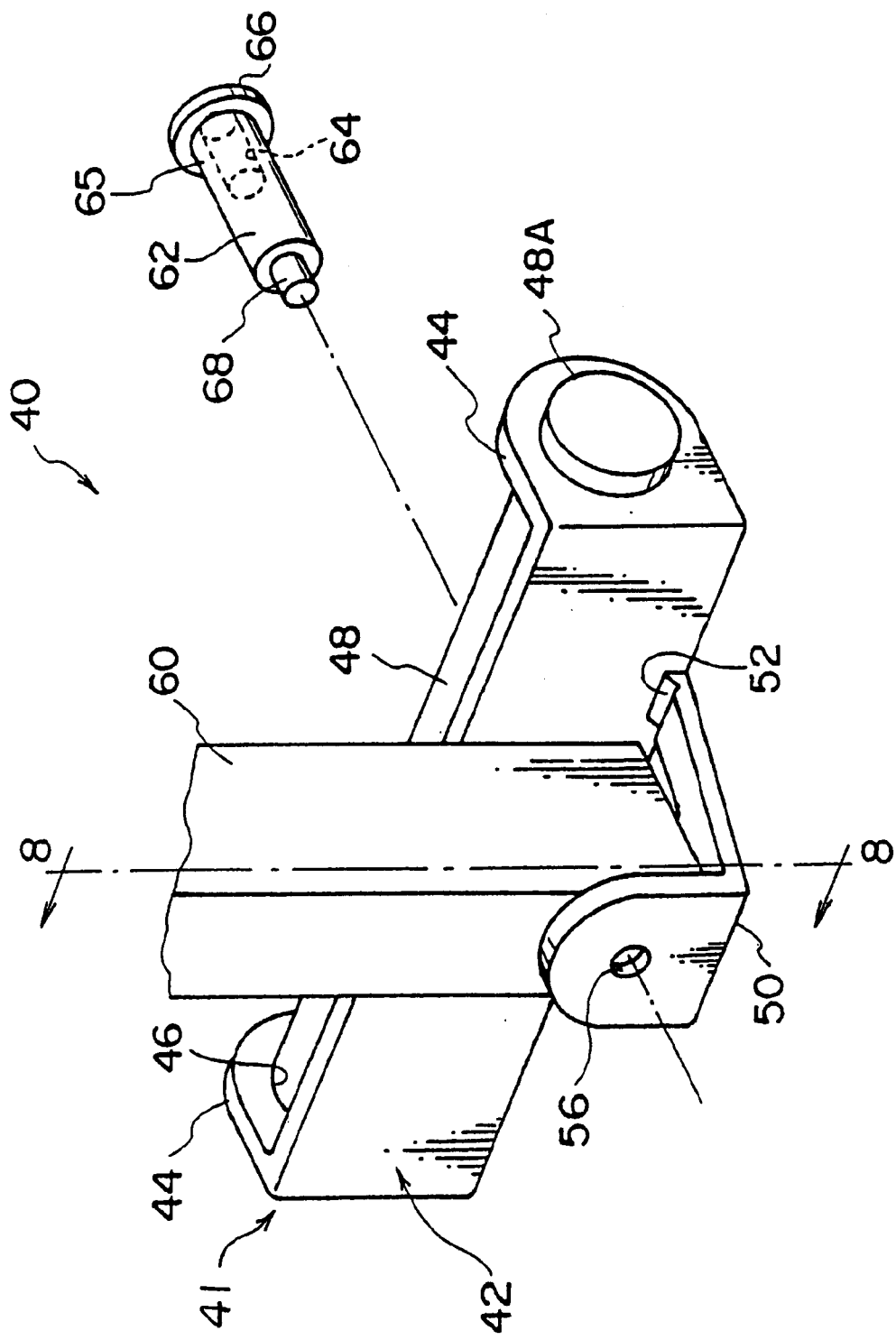
FIG. 7 is an exploded perspective view of a principal portion of a shift lever device according to a second embodiment of the present invention.
Figure 8:
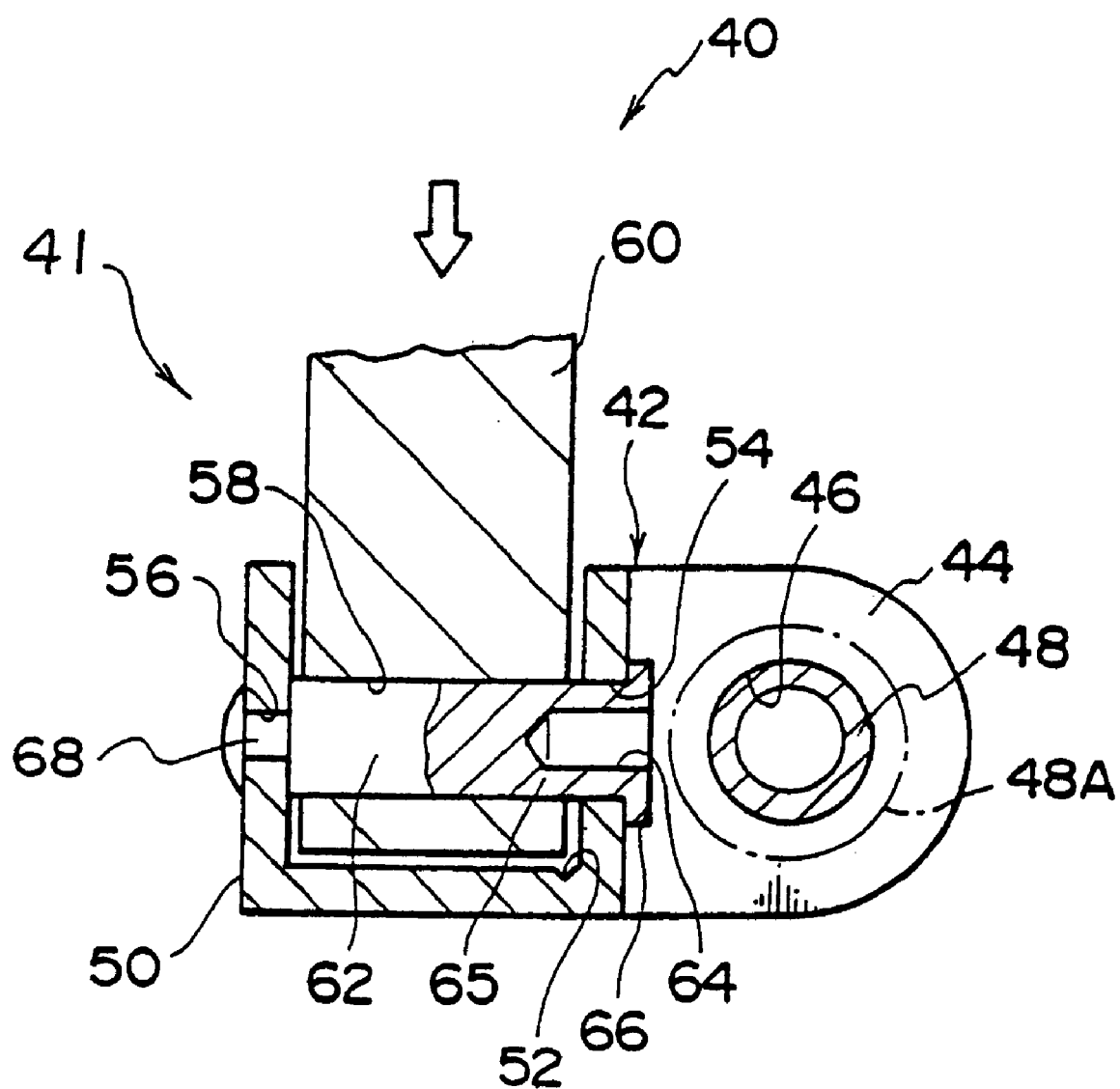
FIG. 8 is a cross-sectional view of the principal portion of the shift lever device according to the second embodiment of the present invention.

FIGS. 7 and 8 each show a shift lever device 40 according to a second embodiment of the present invention.

The shift lever device 40 has a substantially U-shaped rotating bracket 42 outside the interior of the vehicle. A through hole 46 is formed in each of facing end plates 44 of the rotating bracket 42. A control shaft 48 passes through the through holes 46 and is thereby provided to be rotatable together with the bracket 42. A diameter-enlarged portion 48A is formed at each of both end portions of the control shaft 48 to prevent the control shaft 48 from being drawn out from the through holes 46.

Further, in the same way as in the first embodiment, the control shaft 48 is supported by a pair of parallel shaft supporting plates (not shown) formed upright from a main body of the shift lever device 40.

Figure 9:
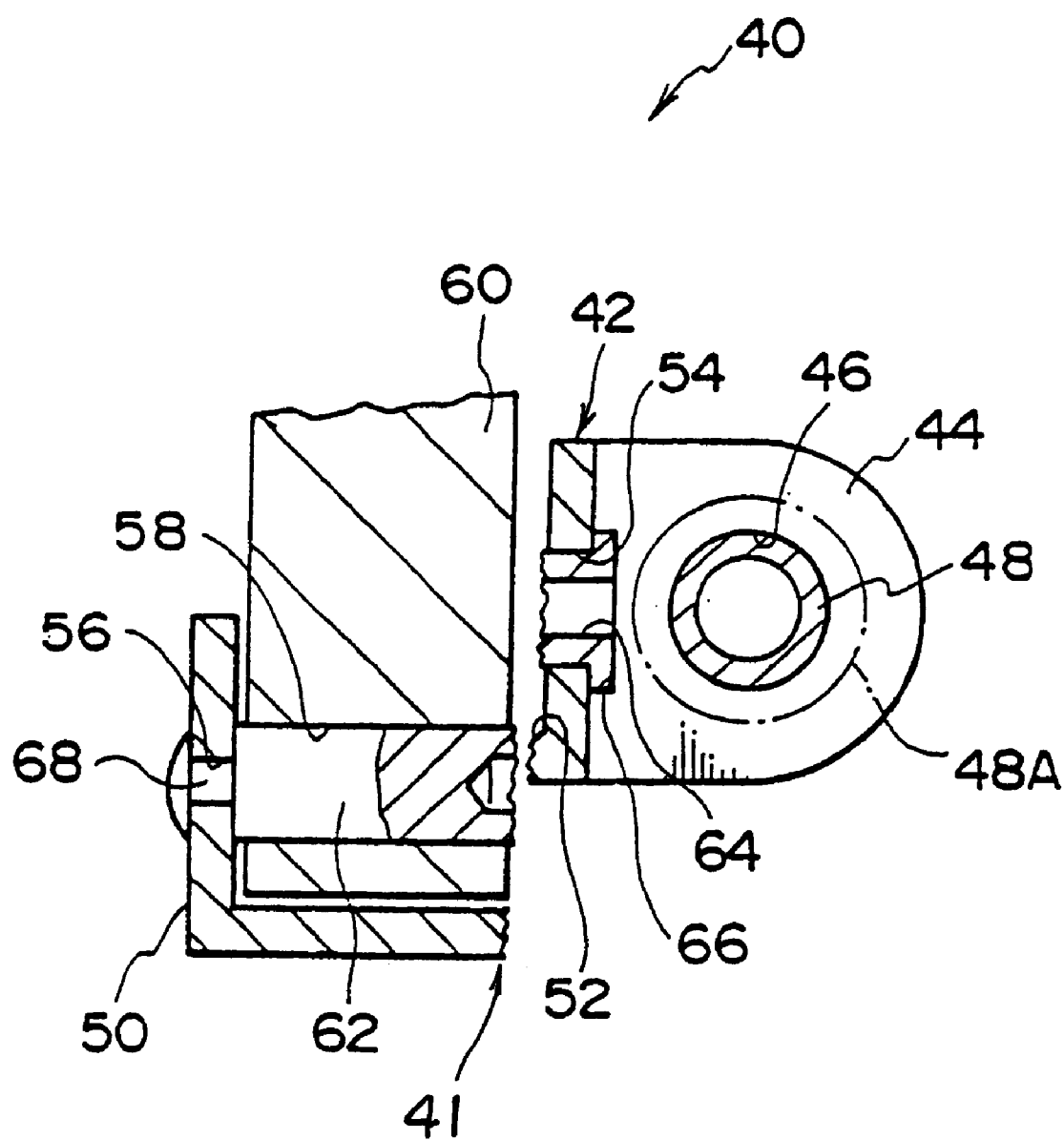
FIG. 9 is a cross-sectional view of the principal portion, which shows a state in which impact force is applied to the shift lever device according to the second embodiment of the present invention.

A supporting bracket 50 having a substantially U-shaped configuration in side view is provided at a substantially intermediate portion of the rotating bracket 42 in the longitudinal direction. A thin-walled portion 52 is formed in the supporting bracket 50 at a location where the supporting bracket 50 is connected to the rotating bracket 42, thereby resulting in lowering of strength of the supporting bracket 50. When force of a predetermined value or more is applied to the supporting bracket 50 from the upper side, as shown in FIG. 9, bending moment acts on the thin-walled portion 52. The thin-walled portion 52 is broken due to the bending moment and the supporting bracket 50 is thereby separated from the rotating bracket 42.

Further, a supporting hole 54 (see FIG. 8) and a supporting hole 56 are formed coaxially in the rotating bracket 42 and the supporting bracket 50, respectively. The lower end of a shift lever 60 in which a shaft hole 58 (see FIG. 8) is formed is provided between the rotating bracket 42 and the supporting bracket 50 and a pin 62 passes through the supporting hole 54, the shaft hole 58, and the supporting hole 56 so as to allow the shift lever 60 to be supported. As a result, the shift lever 60 is provided to be rotatable in the longitudinal direction of the vehicle with the control shaft 48 serving as an axis and is also provided to be rotatable in the transverse direction of the vehicle with the pin 62 serving as an axis.

The pin 62 has a diameter-enlarged portion 66 formed at one end thereof and made thicker than the diameter of the pin 62. When the pin 62 passes through the supporting hole 54, the shaft hole 58, and the supporting hole 56, the diameter-enlarged portion 66 is positioned in such a manner as to abut against the rotating bracket 42.

Further, a breaking portion 65 is formed in the pin 62 in such a manner that a breaking hole 64 having a predetermined length is formed from one end of the pin 62 along the axial direction, thereby resulting in lowering of strength of the pin 62. As a result, as shown in FIG. 9, when force of a predetermined value or more is applied perpendicularly with respect to the axial direction of the pin 62, the pin 62 is broken at the breaking portion 65.

A caulked portion 68 whose diameter is made smaller than the diameter of the pin 62 is formed at the other end of the pin 62. After the pin 62 has passed through the supporting hole 54, the shaft hole 58, and the supporting hole 56, the caulked portion 68 is caulked to increase the diameter thereof and the pin 62 is prevented from being drawn out from the supporting hole 56.

In the shift lever device 40 in an ordinary state, the lower end of the shift lever 60 is, as shown in FIG. 8, provided between the rotating bracket 42 and the supporting bracket 50 and is supported by the pin 62. For this reason, the shift lever 60 is operated to rotate the control shaft 48 and an arbitrary shift range can be selected.

When axial impact force is applied to the shift lever 60 at the time of sudden deceleration of the vehicle, or the like, as shown in FIG. 9, the pin 62 is pressed by the shift lever 60 and is broken at the breaking portion 65. Further, the thin-walled portion 52 of the rotating bracket 42 is also broken. As a result, the impact force applied to the shift lever 60 is absorbed. In addition, the shift lever 60 and the supporting bracket 50 in the state of being integrated with each other by the pin 62 are moved downward.

As described above, by providing a simple structure in which the thin-walled portion 52 is formed in the bracket 42 and the breaking portion 65 is formed in the pin 62, the impact force applied to the shift lever 60 can be absorbed. Moreover, the breaking portion 65 is formed in the pin 62 without alteration of the appearance of the pin 62 so as to lower the strength of the pin 62, and therefore, no alteration in the shape of a mounting portion of the pin 62 is effected.

Figure 10:
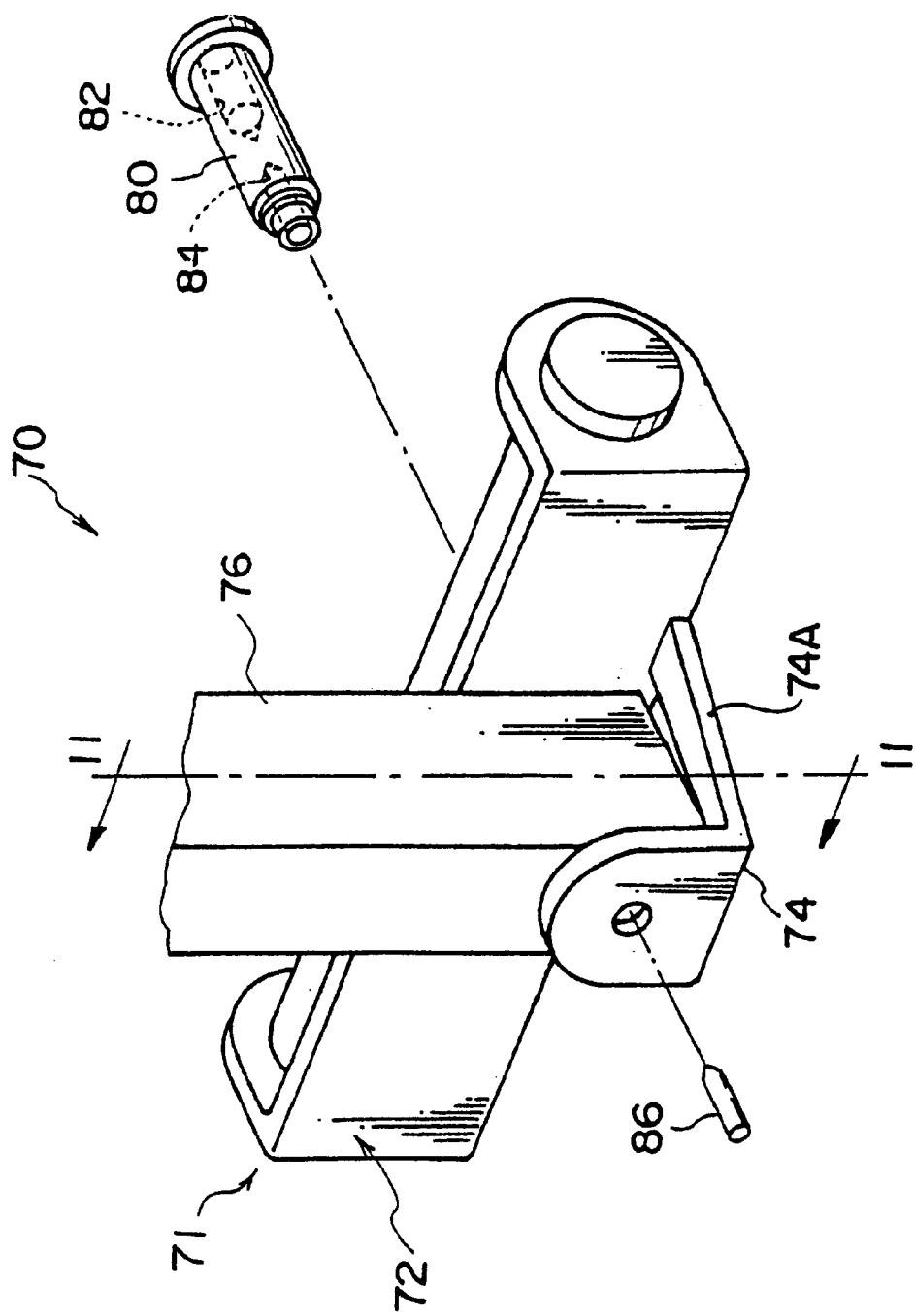
FIG. 10 is an exploded perspective view of a shift lever device according to a modified example of the second embodiment of the present invention.
Figure 11:
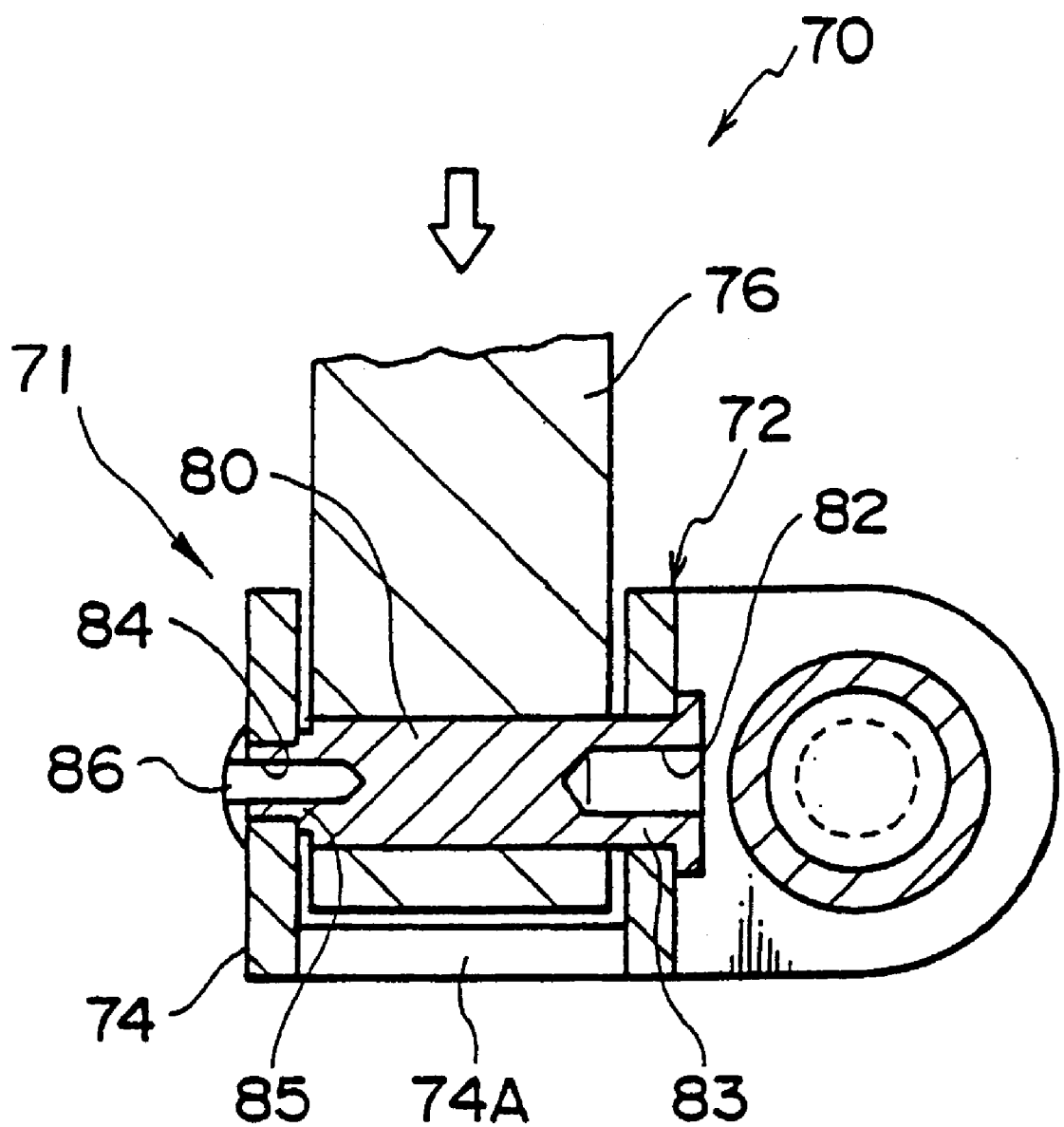
FIG. 11 is a cross-sectional view of the shift lever device according to the modified example of the second embodiment of the present invention.

FIGS. 10 and 11 each show a shift lever device 70 which is a modified example of the shift lever device 40 according to the second embodiment of the present invention.

Figure 12:
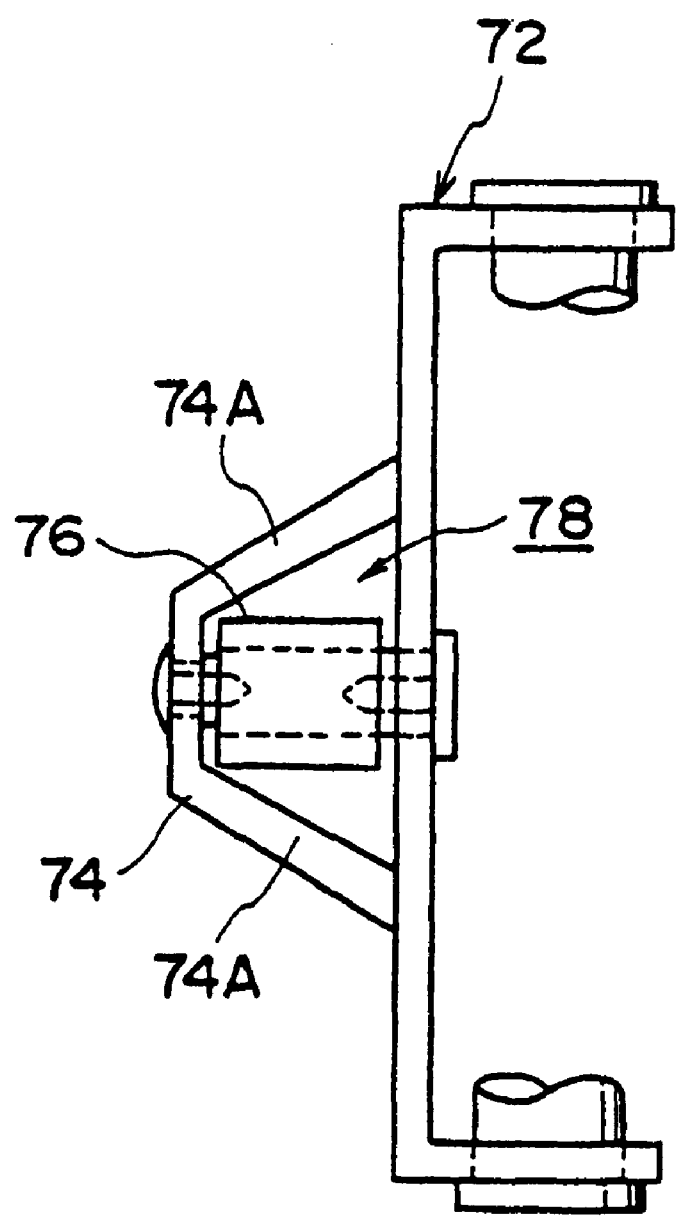
FIG. 12 is a bottom view of a bracket of the shift lever device according to the second embodiment of the present invention.

In the shift lever device 70, in the same manner as in the shift lever device 40 according to the second embodiment, a substantially U-shaped rotating bracket 72 disposed outside the interior of the vehicle has a supporting bracket 74 having a substantially L-shaped configuration in side view. However, a thin-walled portion is not formed in the supporting bracket 74 at a location where the supporting bracket 74 is connected to the rotating bracket 72. Further, as shown in FIG. 12, two bottom plates 74A of the supporting bracket 74 are provided to gradually spread out toward the rotating bracket 72 and the space between the bottom plates 74A is formed as a substantially trapezoidal through hole 78 which is larger than the cross section of the shift lever 76.

Further, in the same manner as in the shift lever device 40, the lower end of the shift lever 76 is provided between the rotating bracket 72 and the supporting bracket 74 and is supported by a pin 80. A breaking portion 83 is formed in the pin 80 in such a manner that a breaking hole 82 having a predetermined length is formed from one end of the pin 80 along the axial direction, thereby resulting in lowering of the strength of the breaking portion 83.

On the other hand, a rivet hole 84 is formed at the other end of the pin 80 and a region around the rivet hole 84 is formed as a breaking portion 85 having a low strength. Further, a rivet 86 is inserted and caulked in the rivet hole 84, thereby preventing the pin 80 from being drawn out.

Figure 13:
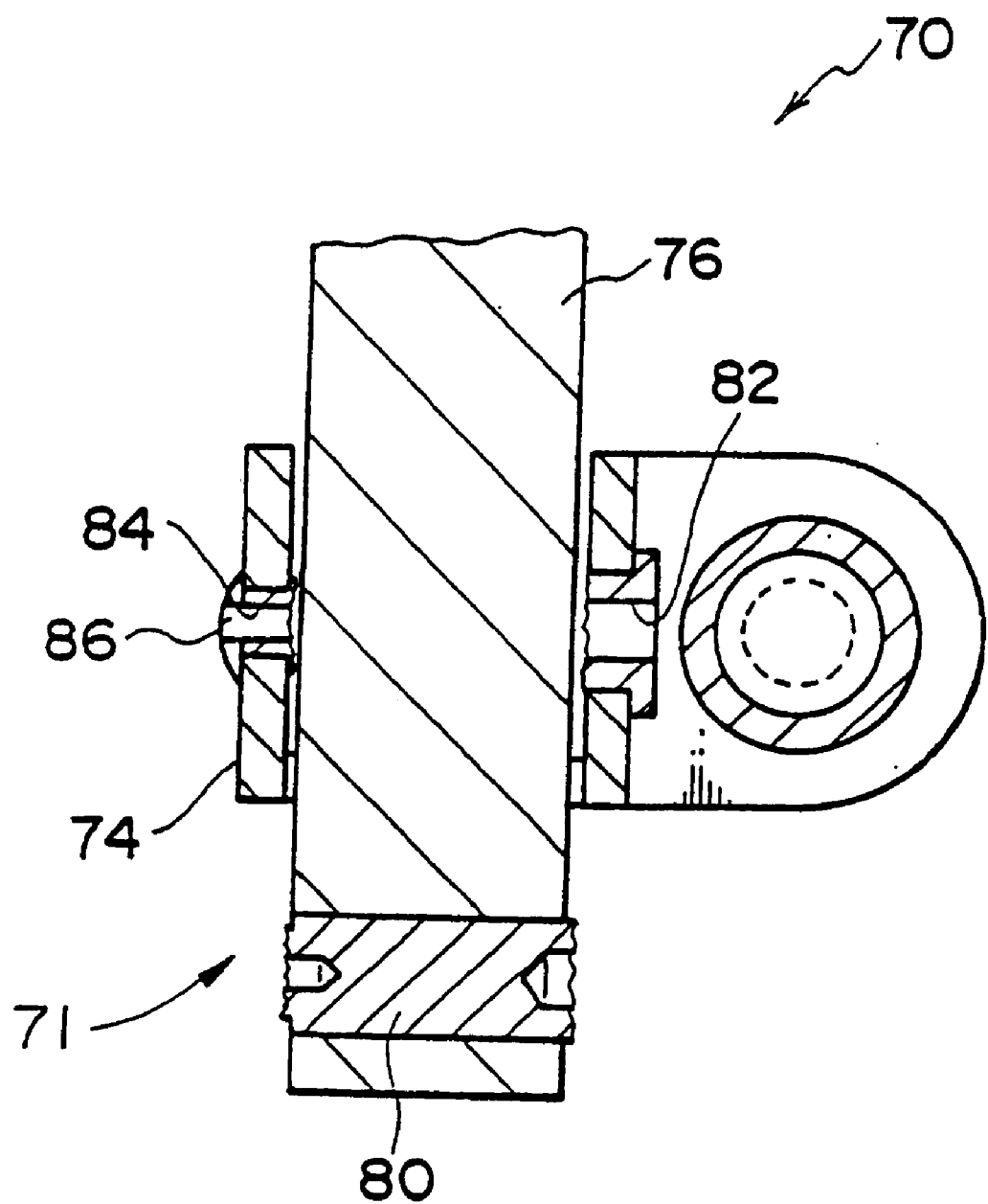
FIG. 13 is a cross-sectional view showing a state in which impact force is applied to the shift lever device according to the modified example of the second embodiment of the present invention.

Accordingly, in the shift lever device 70, as shown in FIG. 13, when impact force of a predetermined value or more is applied in the axial direction of the shift lever 72, the pin 80 is broken at the breaking hole 82 and is also broken at the rivet hole 84 together with the rivet 86, thereby resulting in absorption of the impact force. Since no thin-walled portion is formed in the supporting bracket 74, only the shift lever 76 passes through the through hole 78 to move downward in such a state that the supporting bracket 74 and the rotating bracket 72 are integrated with each other.

Meanwhile, in the above-described shift lever device 40 according to the second embodiment and also in the shift lever device 70 according to the modified example of the second embodiment, at least one pair of wall surfaces may be formed at the front side in the direction in which impact force is applied to the shift lever 60 and the shift lever 76 in such a manner that the space therebetween is gradually made smaller in the direction away from the supporting holes 54, 56, the breaking hole 82, and the rivet hole 84. As a result, the supporting bracket 50 or the lower end of the shift lever 60, and the lower end of the shift lever 76, having moved due to the impact force applied thereto, abut against the wall surfaces and moves to widen the space of the wall surfaces, and therefore, the impact force applied to the shift lever 60 and the shift lever 76 can be effectively absorbed.

Figure 14:
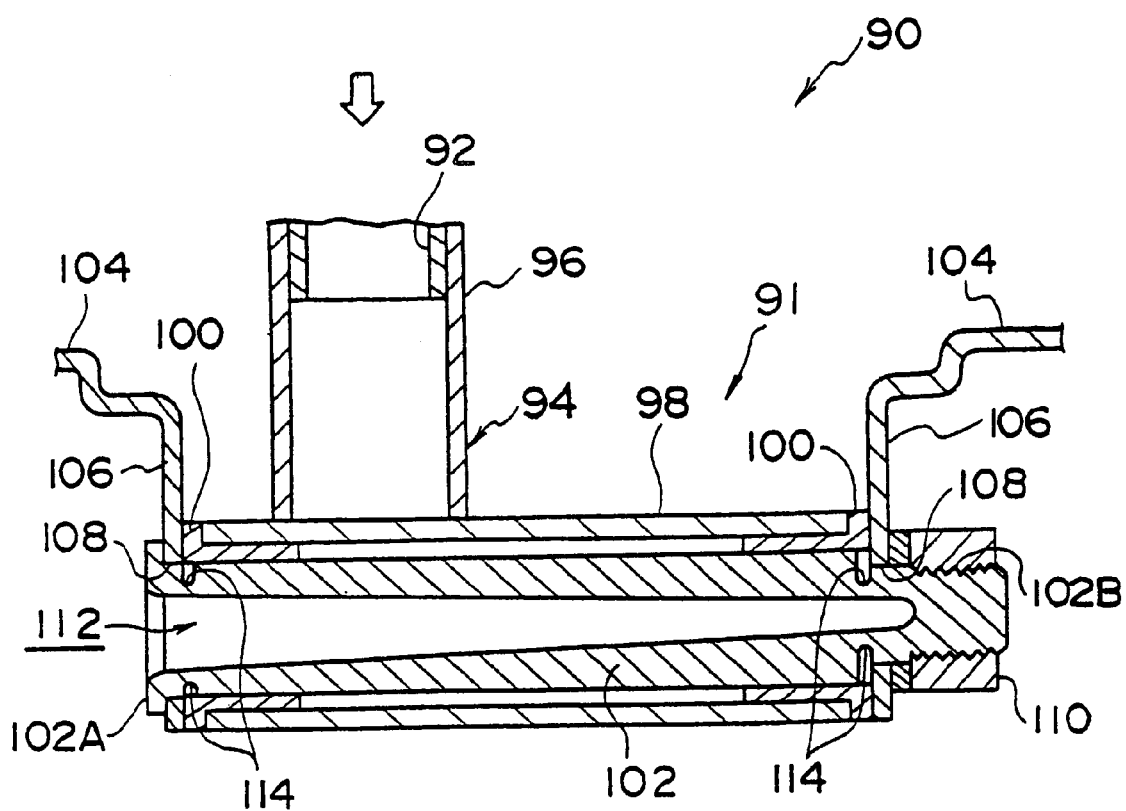
FIG. 14 is a cross-sectional view of a principal portion of a shift lever device according to a third embodiment of the present invention.

FIG. 14 shows a shift lever device 90 according to a third embodiment of the present invention.

In the shift lever device 90, the lower end of a shift lever 92 is mounted to a retainer 94. The retainer 94 has a substantially inverted T-shaped configuration and the lower end of the shift lever 92 is inserted in and fixed to a cylindrical mounting portion 96 formed upright substantially at the center of the retainer 94.

Further, a substantially horizontal portion of the retainer 94 is formed as a cylindrical insertion through portion 98 and a bush 100 is fitted in each of both ends of the insertion through portion 98 and a control shaft 102 passes through the insertion through portion 98.

On the other hand, a pair of bearing plates 106 extends downward from a main body plate 104 provided in the main body of the shift lever device 90 and a shaft supporting hole 108 by which the control shaft 102 is supported is formed at the center of each of the bearing plates 106. The main body plate 104 is provided outside the interior of the vehicle.

One end of the control shaft 102 is formed as a diameter-enlarged portion 102A and the other end thereof is reduced in diameter so as to be formed as a male-screw cutting portion 102B. With the control shaft 102 being supported by the shaft supporting holes 108, one end of the control shaft 102 is prevented from coming out by the diameter-enlarged portion 102A and the other end thereof is prevented from coming out with a nut 110 being screwed into the male screw 102B. In this state, the shift lever 92 is operated to allow selection of an arbitrary shift range.

A substantially wedge-shaped hollow portion 112 is formed in the control shaft 102 from one end to the other end of the control shaft 102. Further, a diameter-reduced portion 114 cut from the outer periphery to the center of the control shaft 102 is formed inside the portion where the control shaft 102 is supported by the shaft supporting hole 108. For this reason, the portion of the control shaft 102 in which the diameter-reduced portion 114 is formed has a low strength.

In the shift lever device 90 as well, the control shaft 102 is usually supported by the shaft supporting holes 108, and therefore, the shift lever 92 is operated to rotate the control shaft 102, thereby allowing selection of an arbitrary shift range.

Figure 15:
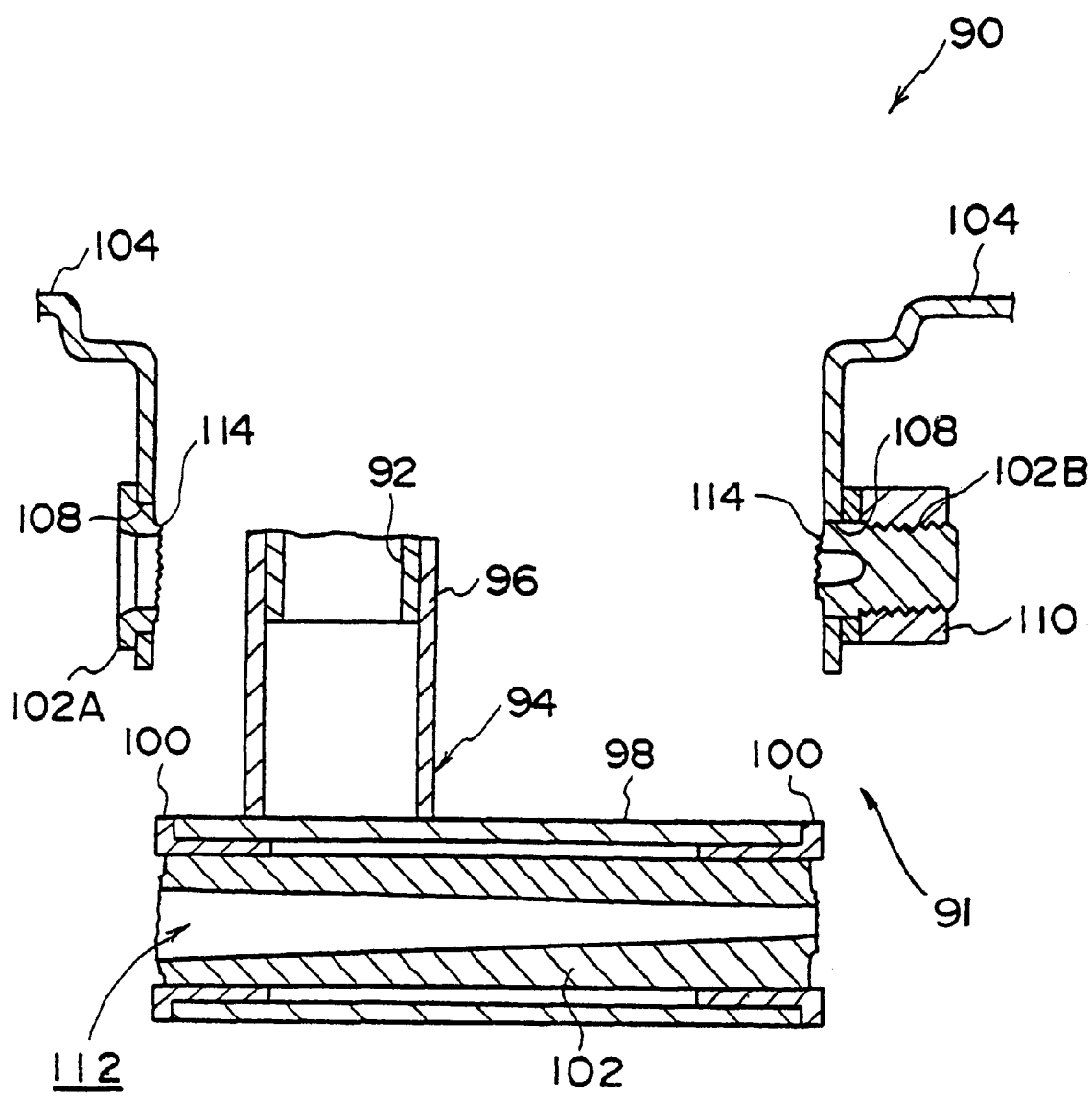
FIG. 15 is a cross-sectional view of the principal portion, which shows a state in which impact force is applied to the shift lever device according to the third embodiment of the present invention.

When axial impact force is applied to the shift lever 92, as shown in FIG. 15, the diameter-reduced portions 114 of the control shaft 102 are broken. Due to the breakage of the diameter-reduced portions 114, the impact force applied to the shift lever 92 can be absorbed. Then, the portion of the control shaft 102 other than the both end portions falls down.

Further, with a simple structure in which the diameter-reduced portions 114 are formed in the control shaft 102, the impact force applied to the shift lever 92 can be absorbed.

As described above, the impact force applied to the shift lever 92 can be absorbed due to the breakage of the diameter-reduced portions 114 formed in the control shaft 102, and therefore, simplification of the structure is achieved without an increase in number of parts. By forming the hollow portion 112 in the control shaft 102, the control shaft 102 can be lightened.

Meanwhile, it is not necessary that these diameter-reduced portions 114 be broken simultaneously. For example, a difference in time of breakage may be made between these diameter-reduced portions 114 in such a manner that the size of the hollow portion 112 is adjusted by varying the shape of the hollow portion 112 in the axial direction of the control shaft 102 so as to change cross-sectional areas of the diameter-reduced portions 114 differently. As a result, when any one of the diameter-reduced portions 114 is first broken by a small impact force and thereafter further impact force is applied, the remaining diameter-reduced portion 114 can be broken. For this reason, the impact force applied to the shift lever 92 can be effectively absorbed in two stages.

Further, in the shift lever device 90 according to the third embodiment, at least one pair of wall surfaces may be formed at the front side in the direction in which the impact force acts on the shift lever 92 so that the space therebetween is gradually made narrow in the direction away from the shaft supporting hole 108. As a result, the retainer 94 moves due to the impact force applied thereto and abuts against the wall surface, and further moves to widen the space of the wall surfaces in the transverse direction. For this reason, the impact force applied to the shift lever 92 can be effectively absorbed.

Figure 16:
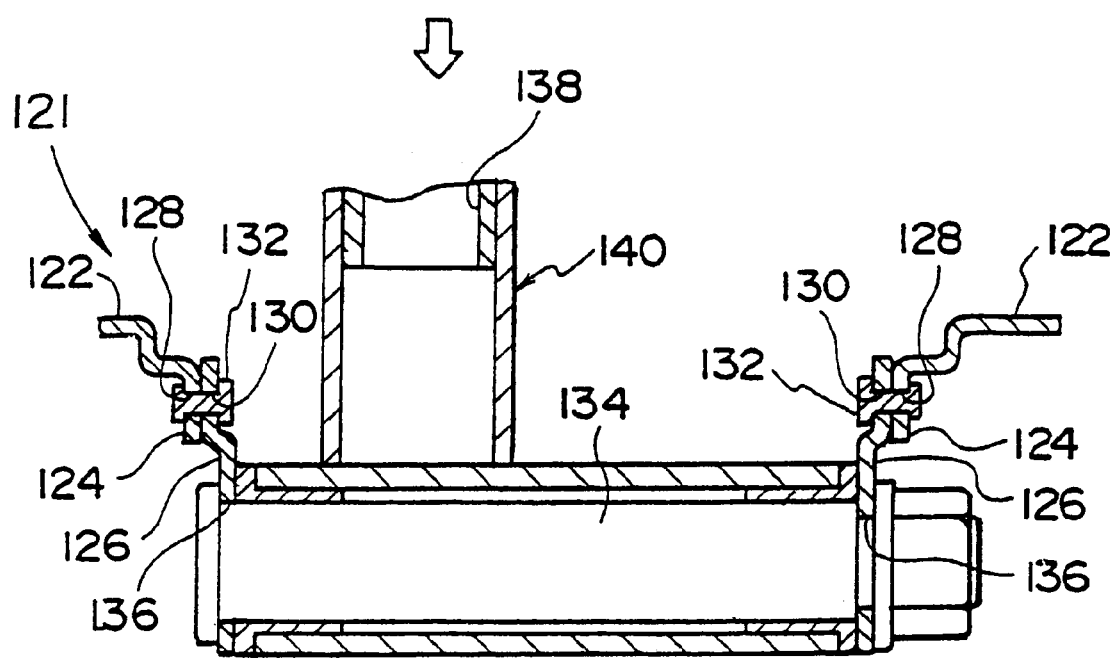
FIG. 16 is a cross-sectional view of a principal portion of a shift lever device according to a fourth embodiment of the present invention.

FIG. 16 shows a shift lever device 120 according to a fourth embodiment of the present invention.

Figure 17:
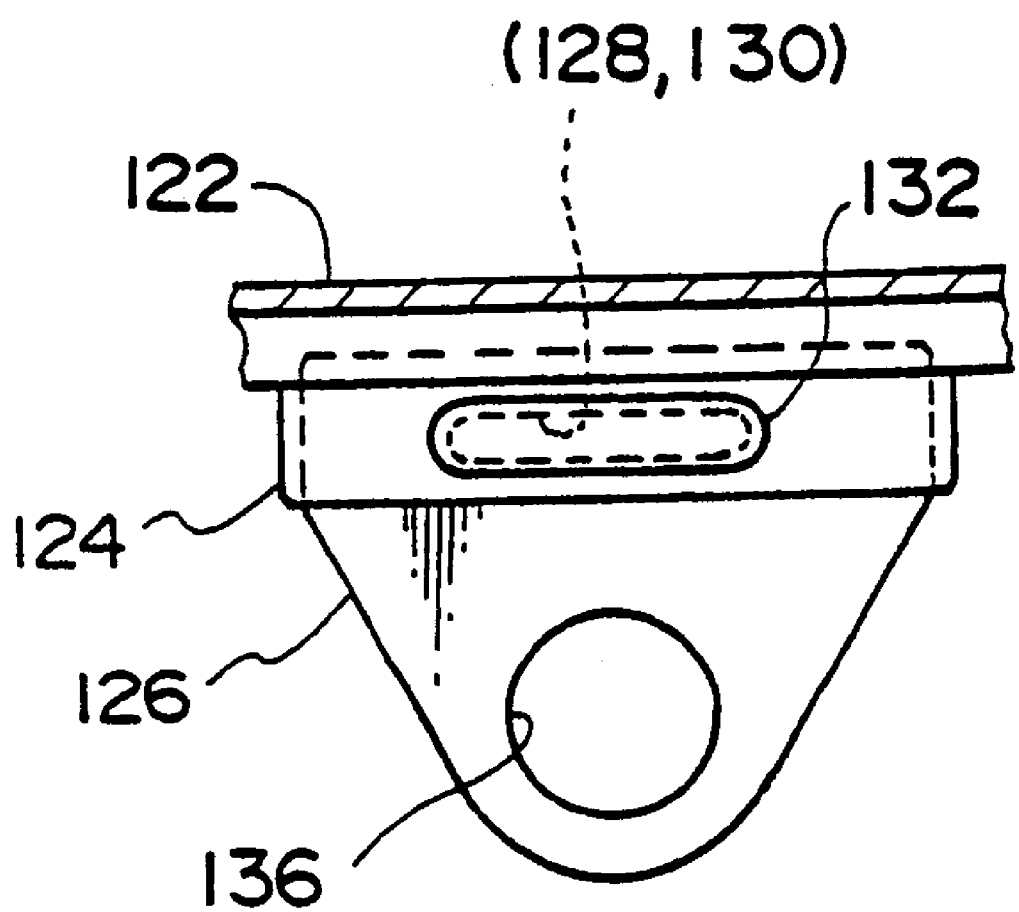
FIG. 17 is a side view of a connecting plate of the shift lever device according to the fourth embodiment of the present invention.

In the shift lever device 120, a main body frame 122 provided outside the interior of the vehicle extends downward to form a pair of mounting plates 124. A connecting plate 126 having a substantially inverted triangular configuration, which is also shown in FIG. 17, is mounted to each of the mounting plates 124. Namely, a shear plate 132 passes through a horizontally oblong fixed hole 128 formed in the mounting plate 124 and a horizontally oblong supporting hole 130 formed in the upper portion of the connecting plate 126 and the connecting plate 126 is mounted to the mounting plate 124. After the shear plate 132 has passed through the fixed hole 128 and the supporting hole 130, both ends thereof in the direction where the shear plate 132 passes through are caulked to prevent drawing of the shear plate 132. Further, the shear plate 132 is formed of a material whose strength is lower than those of the mounting plate 124 and the connecting plate 126.

On the other hand, the lower end of the shift lever 138 is mounted to the retainer 140 and a control shaft 134 passes through an insertion through portion 142 of the retainer 140. Further, a shaft supporting hole 136 is formed in the lower portion of the connecting plate 126 and the control shaft 134 is supported by the shaft supporting holes 136. As a result, the shift lever 138 is operated to rotate so as to allow selection of an arbitrary shift range.

In the shift lever device 120 as well, usually, the connecting plates 126 are respectively mounted to the mounting plates 124, the control shaft 134 is supported by the shaft supporting holes 136, and the insertion through portion 142 of the retainer 140 is supported by the control shaft 134. For this reason, the shift lever 138 is operated to rotate the control shaft 134 and an arbitrary shift range can be selected accordingly.

Figure 18:
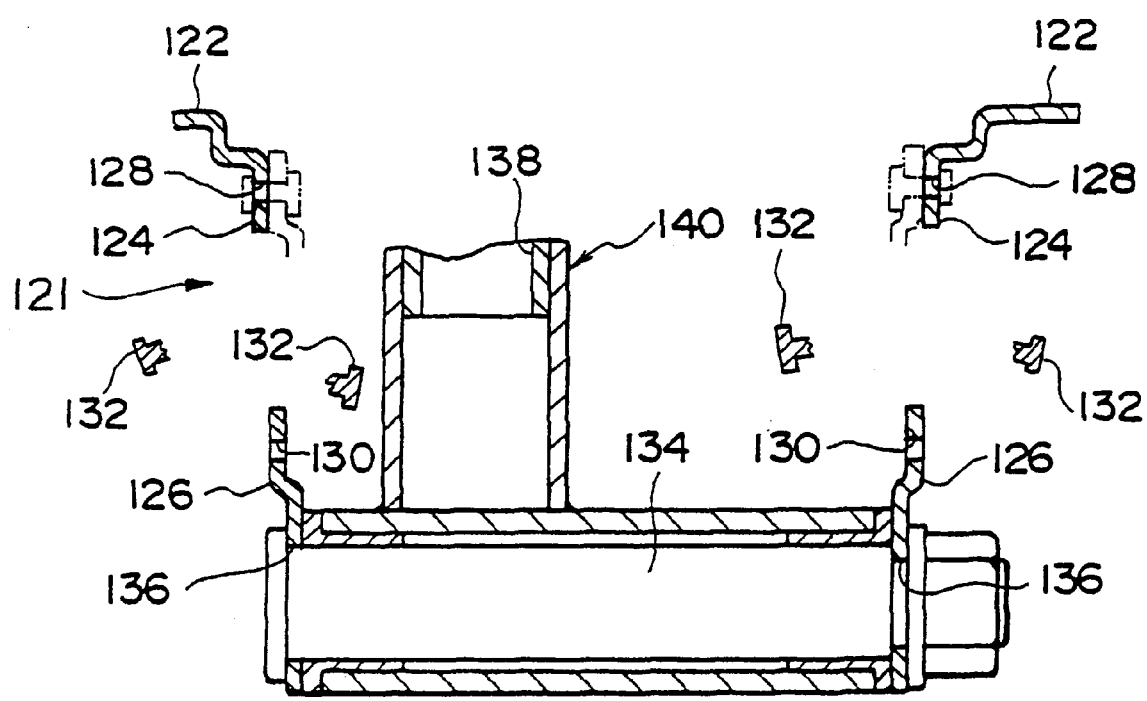
FIG. 18 is a cross-sectional view of the principal portion, which shows a state in which impact force is applied to the shift lever device according to the fourth embodiment of the present invention.

When axial impact force is applied to the shift lever 138, the impact force acts on the shear plates 132 via the retainer 140, the control shaft 134, and the connecting plates 126 so that the shear plates 132 are broken (see FIG. 18). When the shear plates 132 are broken, the connecting plates 126 fall down and the impact force applied to the shift lever 138 can be absorbed. The shear plates 132 are each formed of a material whose strength is lower than that of the mounting plates 124 and the connecting plates 126, and therefore, the shear plates 132 can be broken with no breaking portion being formed in each of the shear plates 132. Meanwhile, the difference in time of breakage may be made between these shear plates 132 by setting each strength of the shear plates 132 differently. As a result, when, after breakage of any one of the shear plates 132 due to a small impact force, further impact force is applied, the remaining shear plate 132 can be broken. For this reason, the impact force applied to the shift lever 138 can be effectively absorbed in two stages. Further, respective thickness dimensions of the shear plates 132 may also be set at different values to vary each strength of the shear plates 132 differently. Alternatively, for example, a portion in which a notch is formed in any one of the shear plates 132 is provided as a fragile portion. Moreover, each breaking strength of fragile portions formed in the shear plates 132 may be set at different values by forming notches of different sizes in the shear plates 132 respectively.

Further, the shift lever 138 and the shear plates 132 are arranged on a straight line and no additional space for installation of the shear plates 132 is thereby required.

Meanwhile, in the shift lever device 120 according to the fourth embodiment, at least one pair of wall surfaces may be formed at the front side in the direction in which the impact force acts on the shift lever 138 so that the space therebetween is gradually made narrow in the direction away from the shaft supporting holes 136. As a result, the retainer 140 moves due to the impact force applied thereto, abuts against the wall surfaces, and further moves to widen the space of the wall surfaces in the transverse direction. For this reason, the impact force applied to the shift lever 138 can be effectively absorbed.

Figure 19:
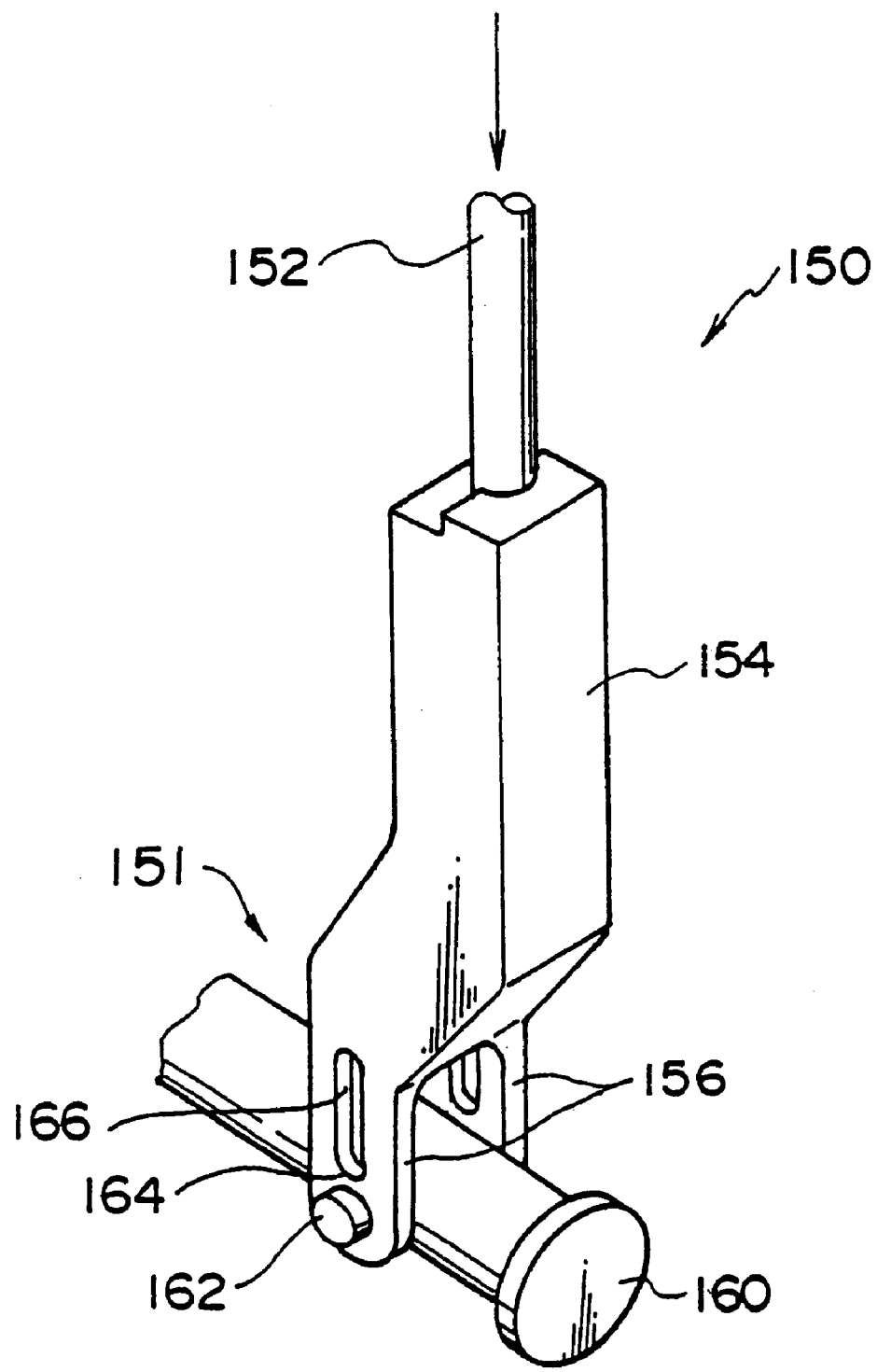
FIG. 19 is a perspective view of a principal portion of a shift lever device according to a fifth embodiment of the present invention.

FIG. 19 shows a shift lever device 150 according to a fifth embodiment of the present invention.

In the shift lever device 150, the lower end of the shift lever 152 is mounted to the lever holder 154. The lever holder 154 is bent at the substantially intermediate portion thereof and a bracket 156 formed by a pair of parallel plates is provided in the lower portion of the lever holder 154.

A shaft supporting hole 158 (see FIG. 20) is formed in the bracket 156. A pin 162 passes through the shaft supporting hole 158 with the bracket 156 straddling a control shaft 160, and the lever holder 154 is rotatably supported by the control shaft 160. In the same manner as in the shift lever device 10 according to the first embodiment, the control shaft 160 is supported by a shaft supporting hole formed on a supporting plate (not shown) of the main body of the shift lever device, which is provided outside the interior of the vehicle. As a result, the shift lever 152 is provided to be rotatable in the longitudinal direction of the vehicle with the control shaft 160 serving as an axis and is also provided to be rotatable in the transverse direction of the vehicle with the pin 162 serving as an axis.

An oblong escape hole 166 is formed above the shaft supporting hole 158 with a predetermined thin-walled portion 164 formed between the escape hole 166 and the shaft supporting hole 158.

In the shift lever device 150, the lever holder 154 is usually supported by the control shaft 160, and therefore, the shift lever 162 is operated to allow selection of an arbitrary shift range.

Figure 20:
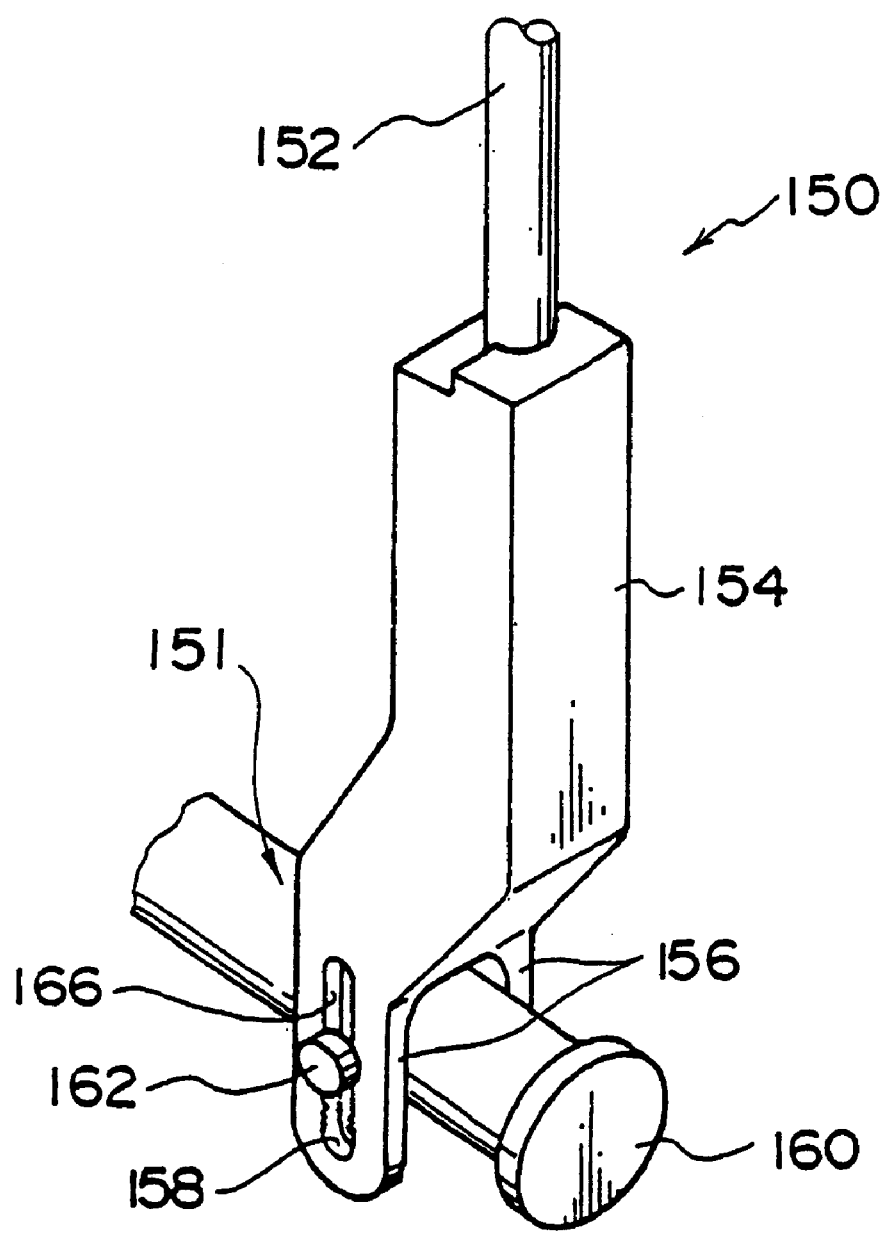
FIG. 20 is a perspective view of the principal portion, which shows a state in which impact force is applied to the shift lever device according to the fifth embodiment of the present invention.

When axial impact force is applied to the shift lever 162, as shown in FIG. 20, the thin-walled portion 164 presses down the pin 162. For this reason, the thin-walled portion 164 is pressed and broken by the pin 162 due to the reaction and the impact force applied to the shift lever 162 can be absorbed. Further, the lever holder 154 falls down due to the breakage of the thin-walled portion 164 and the pin 162 comes into the escape hole 166.

As described above, by providing a simple structure in which the escape hole 166 is formed in the bracket 156 of the shift lever 162 with the thin-walled portion 164 being provided between the escape hole 166 and the shaft supporting hole, the impact force applied to the shift lever 162 can be absorbed.

Meanwhile, in the shift lever device 150, the transverse dimension of the escape hole 166 may be set to be gradually decreased in the upper direction so that the pin 162 coming into the escape hole 166 abuts against the hole wall of the escape hole 166. As a result, when the lever holder 154 is falling down or at an initial stage of the lever holder 154 falling down, the pin 162 moves while widening the escape hole 166 in the transverse direction. For this reason, the decay time of impact force becomes longer and the impact force can be absorbed more effectively.

Further, in the same way as in the shift lever device 31 according to the modified example of the first embodiment, a fragile portion having a low breaking strength may be provided in the thin-walled portion 164 in such a manner that a wedge-shaped notch is formed in the thin-walled portion 164. Namely, when the fragile portion is provided in the thin-walled portion 164, the thin-walled portion 164 is first broken at the fragile portion. Accordingly, the impact force applied to the shift lever 162 can be effectively absorbed.

Moreover, the lever holder 154 is bent substantially at the intermediate portion thereof, and therefore, the impact force applied to the lever holder 154 is not directly transmitted to the control shaft 160.

Figure 21:
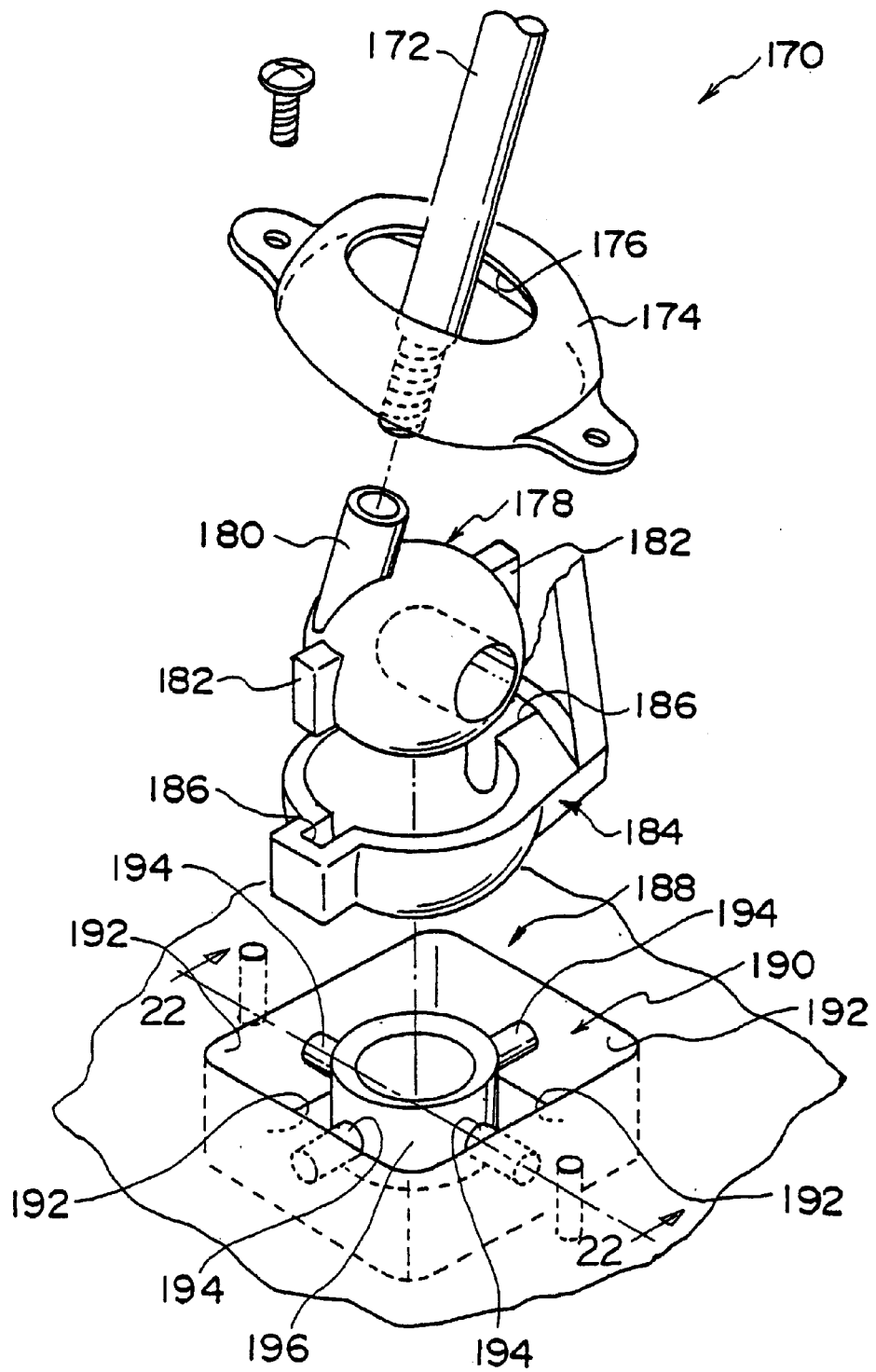
FIG. 21 is an exploded perspective view of a principal portion of a shift lever device according to a sixth embodiment of the present invention.
Figure 22:
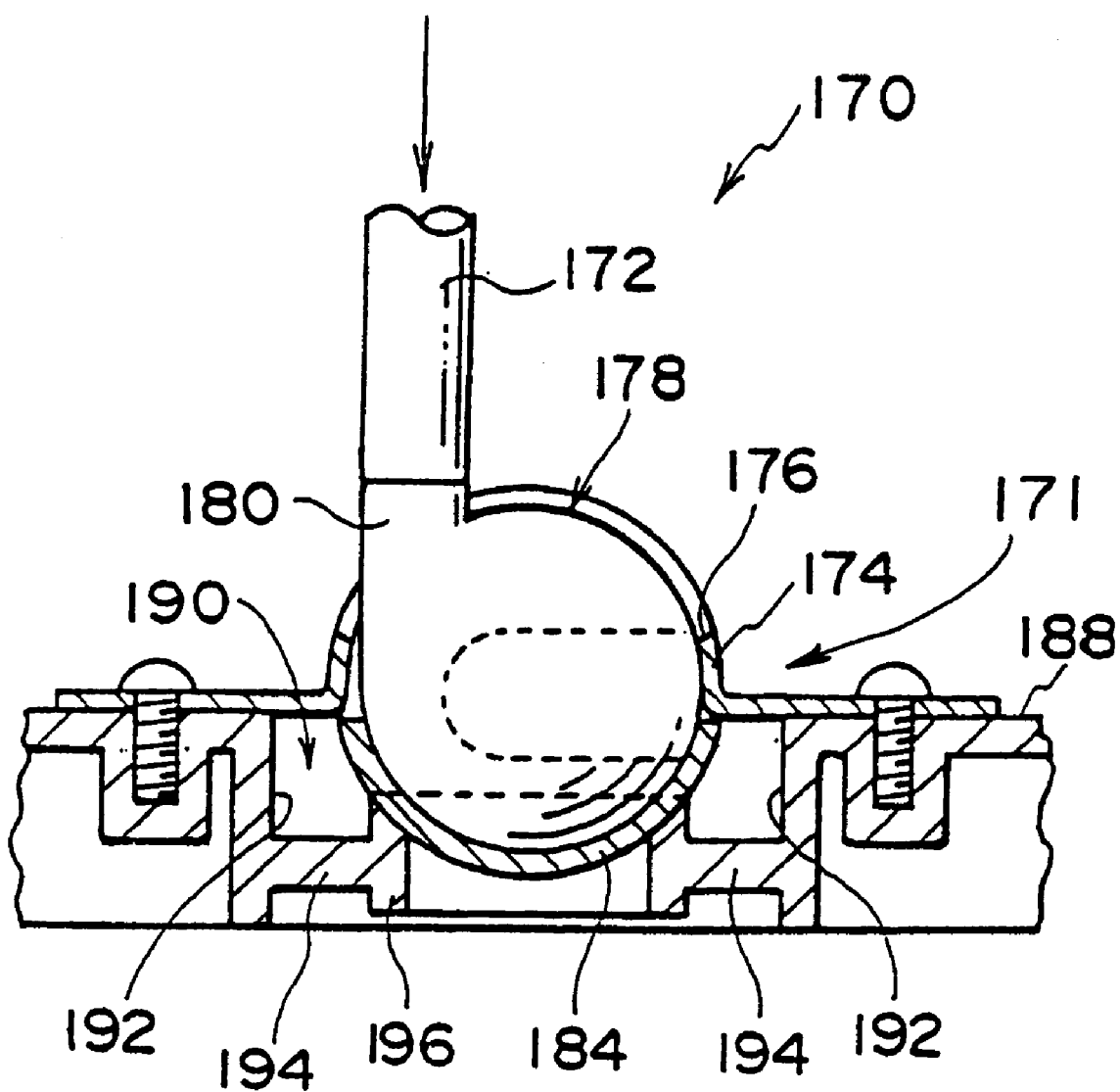
FIG. 22 is a cross-sectional view of the principal portion of the shift lever device according to the sixth embodiment of the present invention.

FIGS. 21 and 22 each show a shift lever device 170 according to a sixth embodiment of the present invention.

In the shift lever device 170, a shift lever 172 is inserted in and passes through a guide hole 176 of a cover plate 174 and the lower end of the shift lever 172 is screwed into a screwed cylinder 180 formed upright from a substantially ball-shaped control spherical body 178. The cover plate 174 is screwed to a shift lever main body 188.

The inner surface of a substantially semi-spherical supporting portion 184 contacts the lower part of the control spherical body 178 to hold the control spherical body 178. The supporting portion 184 has partially protruding portions at opposite sides thereof. A pair of engaging plates 182 projecting from the control spherical body 178 engages with engaging concave portions 186 formed in the protruding portions of the supporting portion 184. Accordingly, when the shift lever 172 is operated, the supporting portion 184 rotates together with the control spherical body 178.

Further, a control lever (not shown) overhangs from the supporting portion 184 and a pin of the control lever is connected to an automatic transmission via a transmission mechanism and the operation of the shift lever 172 allows shift of the automatic transmission.

Figure 23:
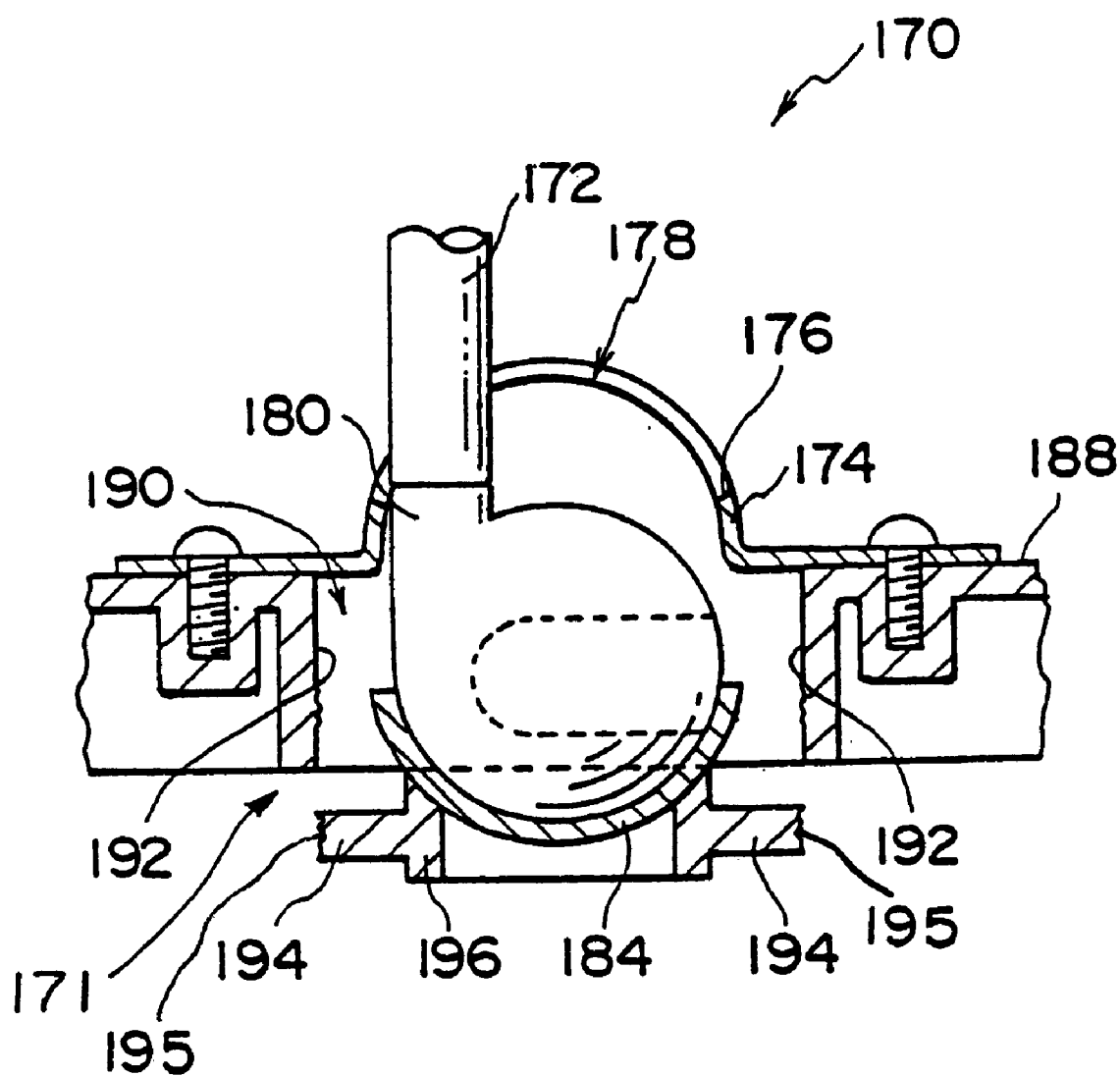
FIG. 23 is a cross-sectional view of the principal portion, which shows a state in which impact force is applied to the shift lever device according to the sixth embodiment of the present invention.
Figure 25:
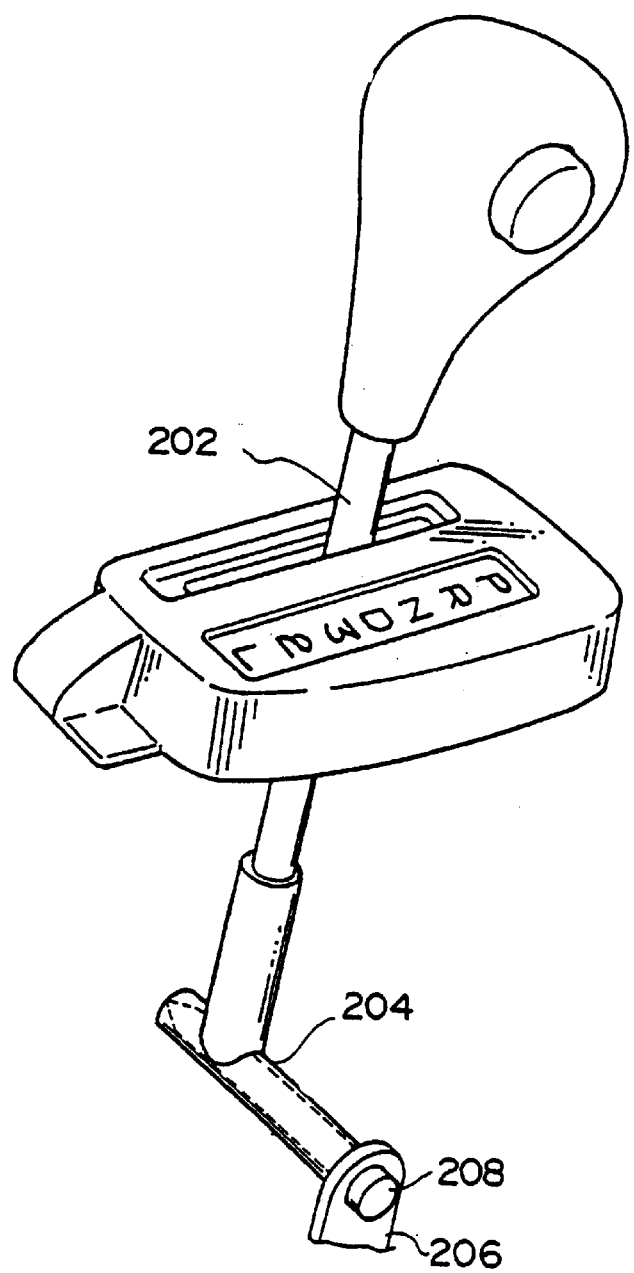
FIG. 25 is a perspective view of a conventional shift lever device.

On the other hand, a substantially square supporting concave portion 190 is formed in the shift lever main body 188 provided outside the interior of the vehicle. A cylindrical supporting cylinder 196 is disposed at the center of the supporting concave portion 190 and is supported by pins 194 each projecting from the substantially center of each of four side walls 192 which form the supporting concave portion 190. When impact force acts on the supporting cylinder 196 from the upper side, the pins 194 are broken as shown in FIG. 23. Meanwhile, each pin 194 may be formed integrally with or separately from one side wall 192.

Further, the upper end surface of the supporting cylinder 196 is bent substantially in the shape of a cone to correspond to the outer peripheral surface of the supporting portion 184 and supports the supporting portion 184 rotatably and smoothly.

In the shift lever device 170 as well, usually, as shown in FIG. 22, the supporting cylinder 196 is supported by the pins 194 and the supporting portion 184 is supported on the supporting cylinder 196. For this reason, the shift lever 172 is operated to allow selection of an arbitrary shift range.

When axial impact force is applied to the shift lever 172, the impact force acts on the pins 194 via the control spherical body 178, the supporting portion 184, and the supporting cylinder 196. As a result, as shown in FIG. 23, the pins 194 are broken at breakable portions 195 and the impact force applied to the shift lever 172 can be absorbed. Further, due to breakage of the pins 194, the supporting cylinder 196, the supporting portion 184, and the control spherical body 178 fall down.

Further, the impact force acts on the pins 194 via the substantially ball-shaped control spherical body 178, and therefore, even if the direction in which the impact force acts is in an unfixed or eccentric state, the pins 194 are reliably broken and the impact force can be absorbed.

Meanwhile, it is not necessary that the pins 194 be set to have the same breaking strength, and the pins 194 may be set to have different breaking strength. As a result, as the impact force increases, the pins 194 are broken sequentially from the pin having the lowest breaking strength. For this reason, the impact force applied to the shift lever 172 can be effectively absorbed in a multistage manner.

Further, in the shift lever device 170 according to the sixth embodiment, wall surfaces may be formed at the front side in the direction in which the impact force acts on the shift lever 172 so that the space therebetween is gradually made narrow in the direction away from the supporting portion 184. As a result, the supporting cylinder 196 having moved due to the impact force abuts against the wall surfaces and further moves to widen the space of the wall surfaces. For this reason, the impact force applied to the shift lever 172 can be effectively absorbed.

Meanwhile, in each of the above-described embodiments, there was described, as an example, a floor shift-type shift lever device provided in the center console of the vehicle, but the location where a shift lever device is installed is not limited to the same. For example, an instrument panel shift-type shift lever device may also be used in which a shift lever device is provided on an instrument panel.

What is claimed is:

1. A shift lever device comprising:
   an elongated shift lever which allows selection of an arbitrary shift range by a shift operation;
   a spherical body to which the shift lever is connected;
   a spherical body supporting portion which supports the spherical body;
   supporting means for supporting the spherical body supporting portion, said supporting means including:
   a plurality of support members for connecting said supporting means to a shift lever device main body, and
   a receiving portion which supports said spherical body supporting portion in a rotatable manner,
   wherein said plurality of support members are a plurality of support pins by which said receiving portion is mounted to said shift lever device main body.

2. A shift lever device according to claim 1, wherein said support members include four support pins.

3. A shift lever device according to claim 1, wherein each of the plurality of support pins has a different breaking strength.

* * * * *